(12) United States Patent
Sedlacek et al.

(10) Patent No.: US 9,877,346 B2
(45) Date of Patent: Jan. 23, 2018

(54) METHOD AND NODES FOR HANDLING ESM INFORMATION

(71) Applicant: Telefonaktiebolaget L M Ericsson (publ), Stockholm (SE)

(72) Inventors: Ivo Sedlacek, Hovorcovice (CZ); Magnus Karlsson, Lund (SE); Mikael Wass, Satila (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 126 days.

(21) Appl. No.: 14/370,294

(22) PCT Filed: Jul. 1, 2014

(86) PCT No.: PCT/EP2014/063933
§ 371 (c)(1),
(2) Date: Jul. 2, 2014

(87) PCT Pub. No.: WO2016/000759
PCT Pub. Date: Jan. 7, 2016

(65) Prior Publication Data
US 2016/0007385 A1 Jan. 7, 2016

(51) Int. Cl.
*H04W 76/02* (2009.01)
*H04W 60/00* (2009.01)
*H04W 48/16* (2009.01)

(52) U.S. Cl.
CPC ........ *H04W 76/02* (2013.01); *H04W 48/16* (2013.01); *H04W 60/00* (2013.01)

(58) Field of Classification Search
CPC ...... H04W 76/02; H04W 48/16; H04W 60/00
See application file for complete search history.

(56) References Cited

U.S. PATENT DOCUMENTS

| 2003/0045290 | A1 | 3/2003 | Tuohimetsa et al. |
| 2012/0250616 | A1 | 10/2012 | Hu et al. |
| 2013/0102270 | A1* | 4/2013 | Suh .......... H04W 4/22 455/404.1 |
| 2014/0169332 | A1 | 6/2014 | Taleb et al. |
| 2014/0355590 | A1* | 12/2014 | Cho ............ H04W 76/022 370/338 |
| 2015/0049612 | A1* | 2/2015 | Zhang ............ H04W 4/18 370/235 |

(Continued)

FOREIGN PATENT DOCUMENTS

GB 2509072 A 6/2014

*Primary Examiner* — Edan Orgad
*Assistant Examiner* — Jeremy Costin
(74) *Attorney, Agent, or Firm* — Rothwell, Figg, Ernst & Manbeck, P.C.

(57) ABSTRACT

The embodiments herein relate to a method in a UE (101) for handling ESM information. The UE (101) supports reception of information to be used in determination of the ESM information. The UE (101) receives, from an MME (105), information about at least one supported EPS network feature which the UE (101) may use. The information is received before the UE (101) sends ESM information to the MME (105). Based on the received information, the UE (101) determines the ESM information for a PDN connection for the UE (101). The UE (101) sends the determined ESM information to the MME (105).

52 Claims, 16 Drawing Sheets

(56) References Cited

U.S. PATENT DOCUMENTS

| | | | |
|---|---|---|---|
| 2015/0208281 A1* | 7/2015 | Kim | H04W 8/082 370/235 |
| 2015/0351136 A1* | 12/2015 | Kaura | H04W 76/064 370/329 |
| 2015/0358898 A1* | 12/2015 | Lair | H04W 48/12 455/434 |

* cited by examiner

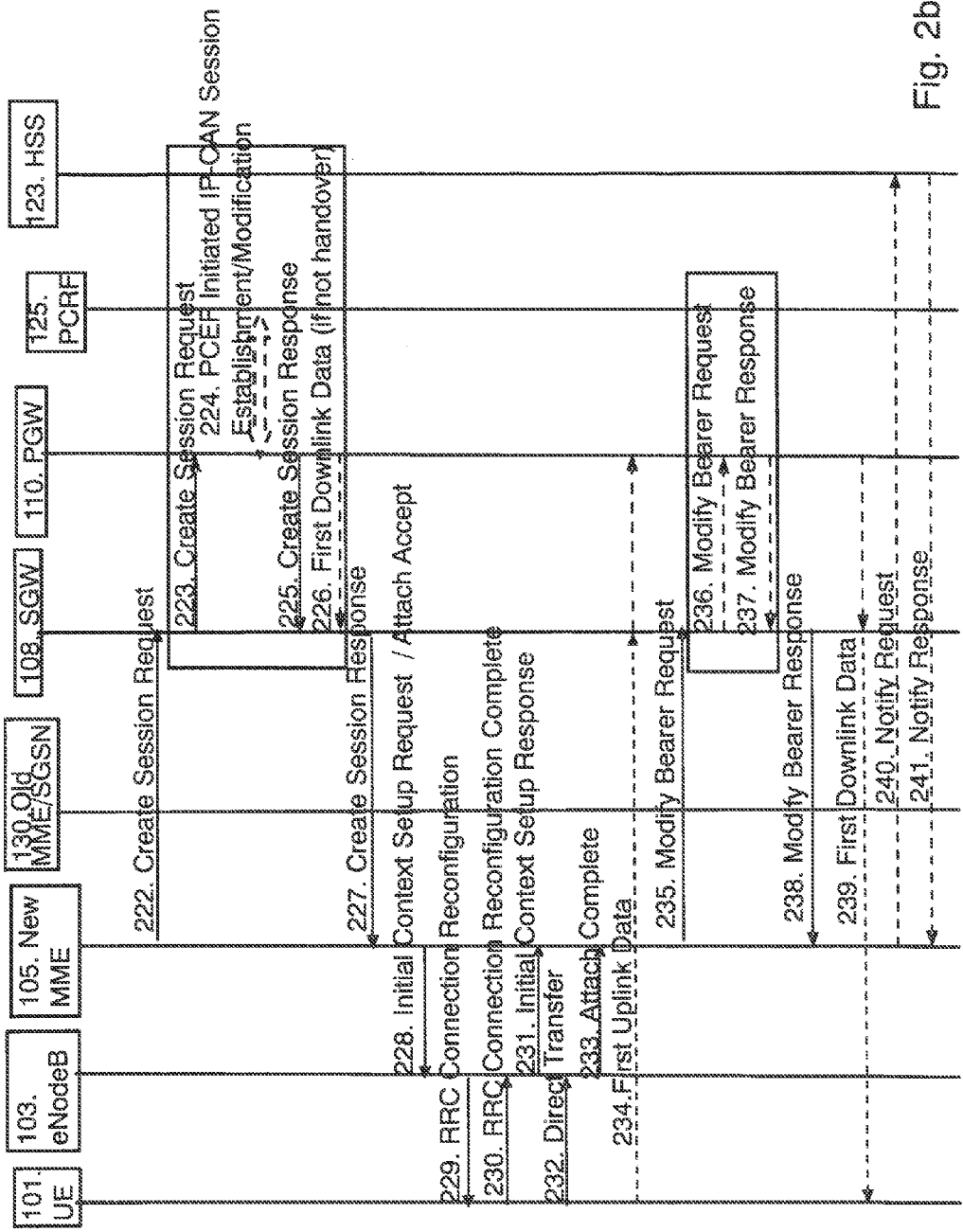

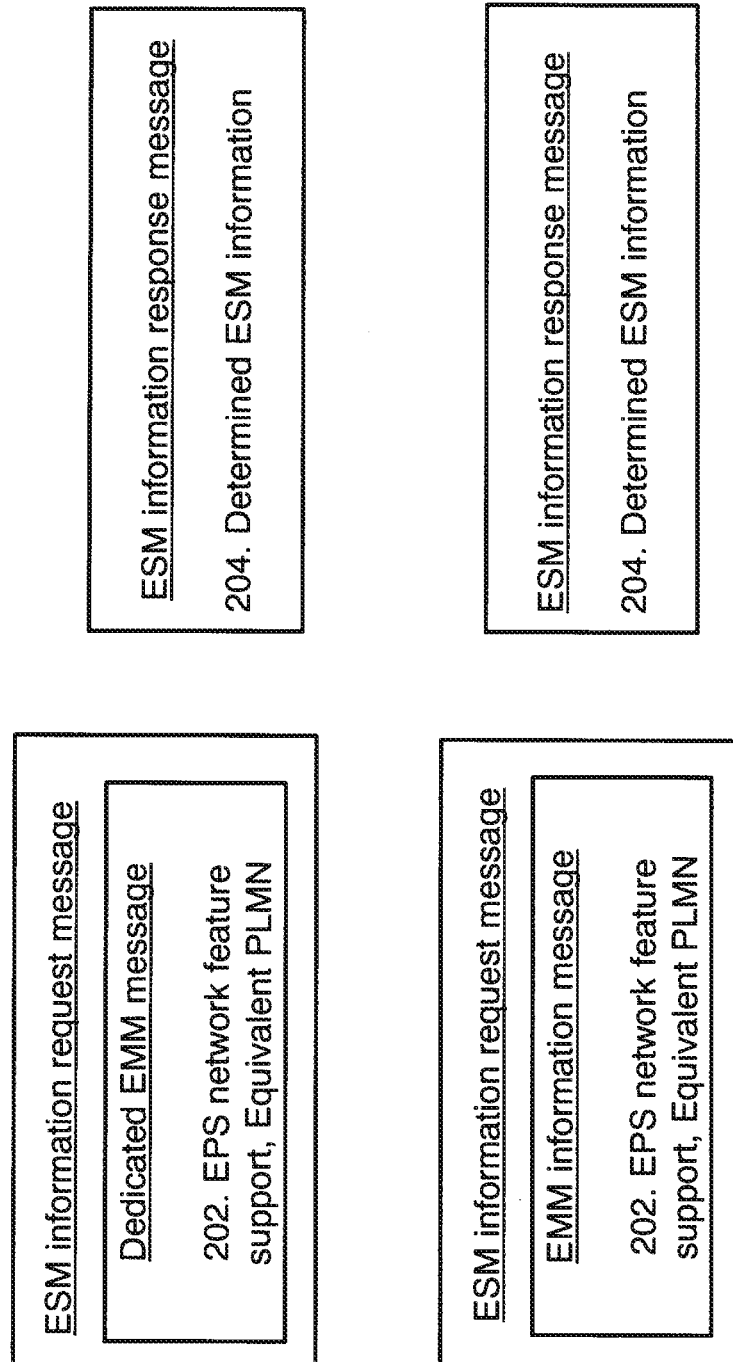

METHOD AND NODES FOR HANDLING ESM INFORMATION

CROSS-REFERENCE TO RELATED APPLICATION

This application is a 35 U.S.C. §371 National Phase Entry Application from PCT/EP2014/063933, filed Jul. 1, 2014, and designating the United States.

TECHNICAL FIELD

Embodiments herein relate generally to a User Equipment (UE), a method in the UE, a Mobility Management Entity (MME) and a method in the MME. More particularly the embodiments herein relate to handling Evolved packet system Session Management (ESM) information.

BACKGROUND

FIG. 1 shows an embodiment of a non-roaming architecture for Third Generation Partnership Project (3GPP) accesses. A UE 101 is served by a Radio Access Network (RAN) node (not shown). The RAN node may be a base station such as a NodeB, an evolved NodeB (eNB, eNodeB), or any other network unit capable of communicating over a radio carrier with the UE 101. The RAN node is comprised in a RAN such as E-UTRAN 103 as illustrated in FIG. 1. E-UTRAN is short for Evolved-UMTS Terrestrial Radio Access Network and UMTS is short for Universal Mobile Telecommunications System. LTE-Uu is the radio protocol of E-UTRAN between the UE 101 and the eNodeB of the E-UTRAN 103. LTE is short for Long Term Evolution.

An MME 105 comprises functions such as Non Access Stratum (NAS) signaling, NAS signaling security, inter Core Network (CN) node signaling for mobility between 3GPP access networks etc. S1-MME is the reference point for the control plane protocol between E-UTRAN 103 and the MME 105.

FIG. 1 shows two gateways, the Serving GateWay (SGW) 108 and the Packet data network GateWay (PGW) 110. The SGW 108 is the gateway which terminates the interface towards E-UTRAN 103. S1-U is the reference point between E-UTRAN 103 and the SGW 108 for the per bearer user plane tunneling and inter eNodeB path switching during handover. The PGW 110 is the gateway which terminates the SGi interface towards the Packet Data Network (PDN). The PDN in FIG. 1 is represented by the Operator's IP Services (e.g. IMS, PSS etc.) 113. S5 is an interface which provides user plane tunneling and tunnel management between the SGW 108 and the PGW 110. IMS is short for Internet protocol Multimedia Subsystem and PSS is short for Packet Switched Streaming.

The Serving GPRS Support Node (SGSN) 115 keeps track of the location of the UE 101 and performs security functions and access control. The SGSN 115 is connected to the GERAN 118 and/or to the UTRAN 120. GPRS is short for General Packet Radio Service. GERAN is short for GSM EDGE Radio Access Network, where GSM is short for Global System for Mobile Communications and EDGE is short for Enhanced Data for Global Evolution. UTRAN is short for UMTS Terrestrial Radio Access Network. S3 is the reference point between the MME 105 and the SGSN 115 and enables user and bearer information exchange for inter 3GPP access network mobility in idle and/or active state. S4 is a reference point which provides related control and mobility support between the SGSN 115 and the SGW 108. S12 is the reference point between UTRAN 120 and the SGW 108 for user plane tunneling when a direct tunnel is established.

The Home Subscriber Server (HSS) 123 is a subscriber database which comprises subscription-related information, performs authentication and authorization of the UE 101, and may provide information about the subscriber's location and Internet Protocol (IP) information. S6a is the reference point that enables transfer of subscription and authentication data for authenticating/authorizing user access to the evolved system between the MME 105 and the HSS 123.

The Policy and Charging Rules Function (PCRF) 125 is a policy and charging control element. Gx is a reference point which provides transfer of policy and charging rules from the PCRF 125 to a Policy and Charging Enforcement Function (PCEF) in the PGW 110. The Rx reference point resides between the PCRF 125 and the Operator's IP Services 113.

The MME 105, the SGW 108, the PGW 110, the SGSN 115 and the HSS 123 may be seen as being part of a CN. The CN may be for example an Evolved Packet Core (EPC) of an LTE system.

A UE 101 needs to register with the network to receive services that require registration. This registration may be described as network attachment. When the UE 101 attaches to the EPC via the E-UTRAN 103, a PDN connection is created for the UE 101 during the attach procedure.

The NAS is a set of protocols in the Evolved Packet System (EPS). The NAS is used to convey non-radio signaling between the UE 101 and the MME 105 for an LTE/E-UTRAN access. The NAS procedures are grouped in two following two categories: the EPS Mobility Management (EMM) and the EPS Session Management (ESM).

The EMM protocol refers to procedures related to mobility over an E-UTRAN access, authentication and security. The ESM protocol offers support to the establishment and handling of user data in the NAS. PDN connection and EPS bearers are two concepts in ESM which defines the IP connectivity between the UE 101 and a PDN. EPS supports multiple simultaneous PDN connections. For instance, a UE 101 may have a PDN connection to the Internet (with a default EPS bearer) and one to the operator's IMS (with additional dedicated bearers, if required by the service).

If the UE 101 wishes to influence parameters (e.g. Access Point Name (APN), Protocol Configuration Options (PCO), etc.) of the PDN connection to be created during the attach procedure, the UE 101 requests the CN represented by the MME 105 to send an ESM Information Request message to the UE 101. When the UE 101 receives the ESM Information Request message, the UE 101 provides the parameters (e.g. APN, PCO, etc.) in an ESM Information Response message. An embodiment of such attach procedure is shown in FIGS. 2a and 2b, which is taken from chapter 5.3.2.1 in 3GPP TS 23.401 V12.4.0 (2014-03). FIG. 2a comprises steps 201-221 and FIG. 2b comprises steps 222-241, i.e. FIG. 2b is a continuation of FIG. 2a. The solid arrows in FIGS. 2a and 2b represent mandatory steps and the dotted arrows represent optional steps. The nodes involved in the procedure in FIGS. 2a and 2b are the UE 101, the eNodeB 103, the MME 105, the SGW 108, the PGW 110, the PCRF 125 and the HSS 123 as also seen in FIG. 1. In addition, an old MME/SGSN 130 and an Equipment Identity Register (EIR) 135 are also involved in the procedure in FIGS. 2a and 2b. In FIGS. 2a and 2b, the MME 105 is referred to as a new MME 105 because it is the MME to which the UE 101 attempts to attach. The old MME/SGSN 130 is the MME/SGSN which the UE 101 was previously attached, i.e. before start of the procedure in FIGS. 2a and 2b and before trying to attach to the new MME 105. The procedure in FIGS. 2a and 2b comprises the following steps, which steps may be performed in any suitable order than described below:

Step 201

This step is seen in FIG. 2a. The UE 101 initiates the attach procedure by the transmission of an Attach Request message to the eNodeB 103. The Attach Request message may comprise parameters such as e.g. International Mobile Subscriber Identity (IMSI) or old Globally Unique Temporary UE Identity (GUTI), Old GUTI type, last visited Tracking Area Identity (TAI) (if available), UE Core Network Capability, Radio Resource Control (RRC) parameters etc. The UE 101 may set a Ciphered Options Transfer Flag in the Attach Request message if it would like to send ESM information such as APN and PCO.

Step 202

This step is seen in FIG. 2a. The eNodeB 103 derives the new MME 105 e.g. from the RRC parameters. The eNodeB 103 forwards the Attach Request message to the new MME 105 for example comprised in an S1-MME control message.

Step 203

This step is seen in FIG. 2a. If the UE 101 identifies itself with GUTI and the MME has changed since detach, the new MME 105 determines the type of the old node, i.e. MME or SGSN 130. The new MME 105 may uses the GUTI received from the UE 101 to derive the old MME/SGSN 130 address, and sends an Identification Request message (comprising e.g. the old GUTI, complete Attach Request message) to the old MME/SGSN 130 to request the IMSI.

Step 204

This step is seen in FIG. 2a. The old MME/SGSN 130 responds with an Identification Response message comprising security parameters to the new MME 105, and the new MME 105 may store the received parameters for later use.

Step 205

This step is seen in FIG. 2a. If the UE 101 is unknown in both the old MME/SGSN 130 and the new MME 105, the new MME 105 sends an Identity Request message to the UE 101 to request the IMSI.

Step 206

This step is seen in FIG. 2a. The UE 101 sends an Identity Response message to the new MME 105 comprising the requested IMSI.

Step 207

This step is seen in FIG. 2a. If no UE context exists for the UE 101 anywhere in the network, if the Attach Request (sent in step 201) was not integrity protected, or if the check of the integrity failed, then an authentication and NAS security setup is performed.

Step 208

This step is seen in FIG. 2a. The new MME 105 sends an Identity Request message to the UE 101, and the UE 101 responds with an Identity Response message.

Step 209

This step is seen in FIG. 2a. The new MME 105 may send the Mobile Equipment (ME) Identity Check Request message to the EIR 130. The ME Identity Check Request comprises the ME Identity and the IMSI. The EIR 103 may respond with ME Identity Check Acknowledgement (i.e. the result of the identify check). Dependent upon the result, the new MME 105 decides whether to continue with this attach procedure or to reject the UE 101.

Steps 210 and 211

This step is seen in FIG. 2a. If the UE 101 has set the Ciphered Options Transfer Flag in the Attach Request message in step 201, the Ciphered Options i.e. PCO or APN or both, shall now be retrieved from the UE 101. This is done by the new MME 105 sending a Ciphered Options Request message to the UE 101. The UE 101 responds with a Ciphered Options Response message to the new MME 105 comprising the Ciphered Options, i.e. PCO or APN or both.

An APN is a reference to a gateway between e.g. the 4G mobile network and the Internet. The APN identifies the PDN that the UE 101 wants to communicate with. In addition to identifying a PDN, an APN may also be used to define the type of service, (e.g. connection to wireless application protocol (WAP) server, multimedia messaging service (MMS)) that is provided by the PDN. An APN may be translated to an IP address. The purpose of the PCO is to provide additional optional information about the destination network that the UE 101 is connecting to. For example, when a UE 101 connects to the Internet it will be given an IP address and it will be given a PCO that includes the default gateway IP address, the DNS server address, etc.

In order to handle situations where the UE 101 may have subscriptions to multiple PDNs, if the PCO comprises user credentials (e.g. user name/password within Password Authentication Protocol (PAP) or Challenge Handshake Authentication Protocol (CHAP) parameters) then the UE 101 should also send the APN to the new MME 105 in the Ciphered Options Response message.

The Ciphered Options Request message may also be referred to as an ESM Information Request message and the Ciphered Options Response message may be referred to as an ESM Information Response message. The term Ciphered Options Request/Response are terms used in 3GPP TS 23.401 and the terms ESM information request/response are terms used in 3GPP TS 24.301. Even though different terms are used, the Ciphered Options Request may be seen as being the same as the ESM information request message and the Ciphered Options Response message may be seen as being the same as the ESM Information Response message and the terms may be used interchangeably herein.

Step 212-214

This step is seen in FIG. 2a. If there are active bearer contexts in the new MME 105 for this particular UE 101 (i.e. the UE re-attaches to the same MME 105 without having properly detached before), the new MME 105 deletes these bearer contexts by sending Delete Session Request messages to the gateways involved, i.e. the SGW 108 and the PGW 110. The gateways 108, 110 acknowledge with Delete Session Response (Cause) message. If a PCRF 125 is deployed, the PGW 110 employs an Internet Protocol-Connectivity Access Network (IP-CAN) Session Termination procedure to indicate that resources have been released.

Step 215

This step is seen in FIG. 2a. The MME 105 sends an Update Location Request message to the HSS 123.

Step 216-217

This step is seen in FIG. 2a. The HSS 123 sends a Cancel Location message to the old MME 130. The old MME 130 acknowledges with a Cancel Location Acknowledgement message to the HSS 123.

Step 218-220

This step is seen in FIG. 2a. If there are active bearer contexts in the old MME/SGSN 130 for this particular UE 101, the old MME/SGSN 130 deletes these bearer contexts by sending Delete Session Request messages to the GWs involved, i.e. the SGW 108 and the PGW 110. The GWs 108, 110 return a Delete Session Response (Cause) message to the old MME/SGSN 130.

Step 221

This step is seen in FIG. 2a. The HSS 123 acknowledges the Update Location message by sending an Update Location Acknowledgement message to the new MME 105.

Step 222

This step is seen in FIG. 2b. The new MME 105 sends a Create Session Request message to the SGW 108.

Step 223

This step is seen in FIG. 2b. The SGW 108 creates a new entry in its EPS Bearer table and sends a Create Session Request message to the PGW 110 indicated by the PGW address received in the previous step 222.

Step 224

This step is seen in FIG. 2b. If dynamic Policy and Charging Control (PCC) is deployed and the Handover Indication is not present, the PGW 110 performs an IP-CAN Session Establishment procedure, i.e. a PCEF Initiated IP-CAN Session Establishment/Modification.

Step 225

This step is seen in FIG. 2b. The PGW 110 returns a Create Session Response message to the SGW 108.

Step 226

This step is seen in FIG. 2b. The PGW 110 sends a First Downlink Data (if not handover) to the SGW 108.

Step 227

This step is seen in FIG. 2b. The SGW 108 returns a Create Session Response message to the new MME 105.

Step 228

This step is seen in FIG. 2b. The new MME 105 sends an Initial Context Setup Request/Attach Accept message to the eNodeB 103. Such Attach Accept message comprises information about at least one supported EPS network feature, e.g. whether IMS voice over Packet Switched (PS) sessions is supported or not, and possibly also at least one Public Land Mobile Network (PLMN) which are equivalent to at least one registered PLMN. The registered PLMN is the PLMN in which the UE 101 is registered, e.g. the HPLMN. The eNodeB 103 forwards the Attach Accept message to the UE 101 (not illustrated in FIG. 2b). The Attach Accept message in step 228 is a response to the Attach Request message in step 201.

Step 229

This step is seen in FIG. 2b. The eNodeB 103 sends an RRC Connection Reconfiguration message to the UE 101.

Step 230

This step is seen in FIG. 2b. The UE 101 sends an RRC Connection Reconfiguration Complete message to the eNodeB 103.

Step 231

This step is seen in FIG. 2b. The eNodeB 103 sends an Initial Context Setup Response message to the new MME 105.

Step 232

This step is seen in FIG. 2b. The UE 101 sends a Direct Transfer message to the eNodeB 103.

Step 233

This step is seen in FIG. 2b. The eNodeB 103 sends an Attach Complete message to the new MME 105.

Step 234

This step is seen in FIG. 2b. After the Attach Accept message and once the UE 101 has obtained a PDN Address, the UE 101 may then send uplink packets, i.e. the first uplink data, towards the eNodeB 103 which will then be tunneled to the SGW 108 and the PGW 110.

Step 235

This step is seen in FIG. 2b. The new MME 105 sends a Modify Bearer Request message to the SGW 108.

Step 236

This step is seen in FIG. 2b. The SGW 108 sends a Modify Bearer Request message to the PGW 110.

Step 237

This step is seen in FIG. 2b. The PGW 110 sends a Modify Bearer Response message to the SGW 108.

Step 238

This step is seen in FIG. 2b. The SGW 108 sends a Modify Bearer Response message to the new MME 105.

Step 239

This step is seen in FIG. 2b. The SGW 108 sends its buffered downlink packets to the UE 101, i.e. the first downlink data.

Step 240

This step is seen in FIG. 2b. The new MME 105 sends a Notify Request message to the HSS 123.

Step 241

This step is seen in FIG. 2b. The HSS 123 sends a Notify Response message to the new MME 105.

As mentioned above, steps 210 and 211 seen in FIG. 2a are related to ESM information.

So, the UE 101 provides the ESM information (e.g. APN, PCO or both) of a first PDN connection over E-UTRAN in the ESM Information Response message/Ciphered Options Response message in step 211. After the UE 101 has provided the ESM information of the first PDN connection over E-UTRAN, the new MME 105 sends an Attach Accept message to the eNodeB 103 in step 228. With the Attach Accept message information such as e.g. information about at least one supported EPS network feature (e.g. whether IMS voice over PS sessions is supported or not), at least one PLMN which is equivalent to the registered PLMN etc. is comprised.

There are situations when the UE 101 would like to indicate parameters such as e.g. APN, PCO, depending on whether the UE 101 roams or is at home. In one example, the UE 101 wants to have the PDN connection with Internet APN when at home. Another example is that the UE 101 does not want the PDN connection with Internet APN when roaming (e.g. does not want to be charged the roaming fees of the Internet access) and instead the UE 101 will create a PDN connection to IMS APN. The term home refers to the Home PLMN (HPLMN) of the UE 101 and is the network in which the subscriber's profile of the UE 101 is held. When a UE 101 is roaming it may be in a Visited PLMN (VPLMN), i.e. when the UE 101 loses coverage of its HPLMN. When the UE 101 is roaming it may receive services from a PLMN which is different from its HPLMN. A HPLMN and VPLMN may be operated by different network operators or by the same network operator.

When the UE 101 attaches to a PLMN other than the HPLMN of the UE 101, i.e. it attaches to a VPLMN, and when the equivalent PLMNs Information Element (IE) indicated in an Attach Accept message (see step 228 in FIG. 2) comprises the HPLMN of the UE 101 the UE 101 may believe it is roaming until the Attach Accept message is received. The UE 101 may believe it is at home (since 3GPP TS 22.011 states: "It shall also be possible to indicate to the UE 101 that a group of PLMNs are equivalent to the registered PLMN regarding PLMN selection, cell selection/re-selection and handover.") after the Attach Accept message is received by the UE 101. However, an ESM Information Response message needs to be sent before an Attach Accept message is received. The equivalent PLMN may be abbreviated EPLMN or EHPLMN (Equivalent HPLMN).

The EPLMN or EHPLMN defines a set of PLMN which are treated as equivalent to PLMN with which UE 101 is registering.

Thus, when the UE 101 attaches to a PLMN other than the HPLMN of the UE 101, when sending the ESM Information Response message, the UE 101 does not know whether it is going to be roaming (if the equivalent PLMN information is indicated in a later received Attach Accept message is not comprised or does not comprise the HPLMN of the UE 101), or whether it is going to be at home (if the equivalent PLMN information indicated in the later received Attach Accept comprises the HPLMN of the UE 101) and parameters of the PDN connection to be created may be setup incorrectly.

SUMMARY

An objective of the embodiments herein is therefore to obviate at least one of the above disadvantages and to provide improved handling of ESM information.

According to a first aspect, the objective is achieved by a method in a UE for handling ESM information. The UE supports reception of information to be used in determination of the ESM information. The UE receives, from a MME, information about at least one supported EPS network feature which the UE may use. The information is received before the UE sends ESM information to the MME. Based on the received information, the UE determines the ESM information for a PDN connection for the UE. The UE sends the determined ESM information to the MME.

According to a second aspect, the objective is achieved by method in a MME for handling ESM information. The MME sends, to the UE, information about at least one supported EPS network feature which the UE may use. The information is sent before the MME receives ESM information from the UE. The MME receives the ESM information from the UE. The ESM information is for a PDN connection for the UE. The ESM information has been determined by the UE based on the sent information.

According to a third aspect, the objective is achieved by a UE configured for handling ESM information. The UE is configured to support reception of information to be used in determination of the ESM information. The UE is further configured to receive, from the MME, information about at least one supported EPS network feature which the UE may use. The information is received before the UE sends ESM information to the MME. Based on the received information, the UE is configured to determine the ESM information for a PDN connection for the UE. The UE is configured to send the determined ESM information to the MME.

According to a fourth aspect, the objective is achieved by a MME configured for handling ESM information. The MME is configured to send, to a UE, information about at least one supported EPS network feature which the UE may use. The information is sent before the MME receives ESM information from the UE. The MME is configured to receive the ESM information from the UE. The ESM information is for a PDN connection for the UE. The ESM information has been determined by the UE based on the sent information.

Since the MME provides the UE with information about at least one supported EPS network feature (and possibly other information), before the ESM information is sent, the UE is able to determine whether it is roaming or it is at home. Thereby the UE is able to base its selection of PDN connection on the roaming situation, i.e. handling of ESM information is improved. Embodiments herein afford many advantages, of which a non-exhaustive list of examples follows:

An advantage of the embodiments herein may be that they may enable the UE to determine whether it roams or not both when the MME is configured with information about at least one equivalent PLMN and when the MME is not configured with information about at least one equivalent PLMN.

Another advantage of the embodiments herein may be that they may enable the UE to determine whether it roams or not both when MME network is configured with information about at least one equivalent PLMN. When the MME is not configured with information about at least one equivalent PLMN, the UE is unable to determine whether it roams or not until an Attach Accept message is received.

A further advantage of the embodiments herein may be that when information about the at least one supported EPS network feature is provided before the UE provides the ESM information (APN, PCOs or both) of the first PDN connection, the UE may avoid creation of a PDN connection to unwanted APNs, e.g. if the UE wants to establish PDN connection to the IMS well known APN only when the IMS voice over PS sessions is supported.

Another advantage of the embodiments herein may be that when information about the at least one supported EPS network feature is provided before the UE provides the ESM information (APN, PCOs or both) of the first PDN connection the UE may specify a correct APN of the first PDN connection when the HPLMN is an equivalent PLMN, e.g. if the UE wants to establish a PDN connection to the Internet APN only when the UE does not roam, i.e. when the HPLMN is the registered PLMN or when the HPLMN is equivalent to the registered PLMN.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

FIGS. 2*a* and 2*b* are signaling diagrams illustrating embodiments of an attach procedure.

FIG. 5*a*-5*e* are schematic block diagrams illustrating embodiments of alternatives 1-5.

The drawings are not necessarily to scale and the dimensions of certain features may have been exaggerated for the sake of clarity. Emphasis is instead placed upon illustrating the principle of the embodiments herein.

DETAILED DESCRIPTION

Figure 3:
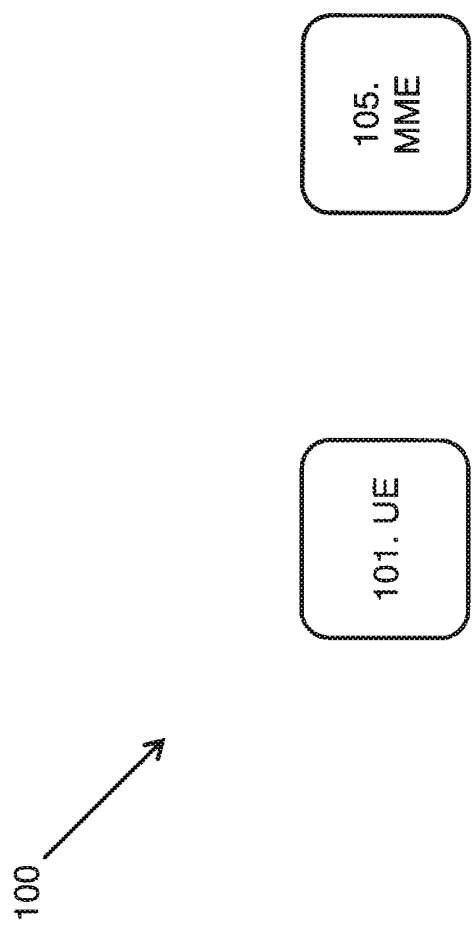
FIG. 3 is a schematic block diagram illustrating embodiments of a communications system.

FIG. 3 depicts a communications system 100 in which embodiments herein may be implemented. The communications network 100 may in some embodiments apply to one or more radio access technologies such as for example LTE/E-UTRAN or any other 3GPP radio access technology or other radio access technologies.

The communications system 100 comprises at least one of a UE 101 and a MME 105. The communications system 100 may comprise additional nodes, such as one or more of the nodes illustrated in FIG. 1 and described above. However, such additional node(s) will not be repeated here for the sake of simplicity. In the embodiments herein, the MME 105 may be either a new MME or an old MME.

The UE 101 may be a device by which a subscriber may access services offered by an operator's network and services outside the operator's network to which the operator's RAN and CN provide access, e.g. access to the Internet. The UE 101 may be any device, mobile or stationary, wired or wireless, enabled to communicate in the communications system 100, for instance but not limited to e.g. wireless device, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The UE 101 may be portable, pocket storable, hand held, computer comprised, or vehicle mounted devices, enabled to communicate voice and/or data, via the RAN, with another entity, such as another UE or a server.

Figure 1:
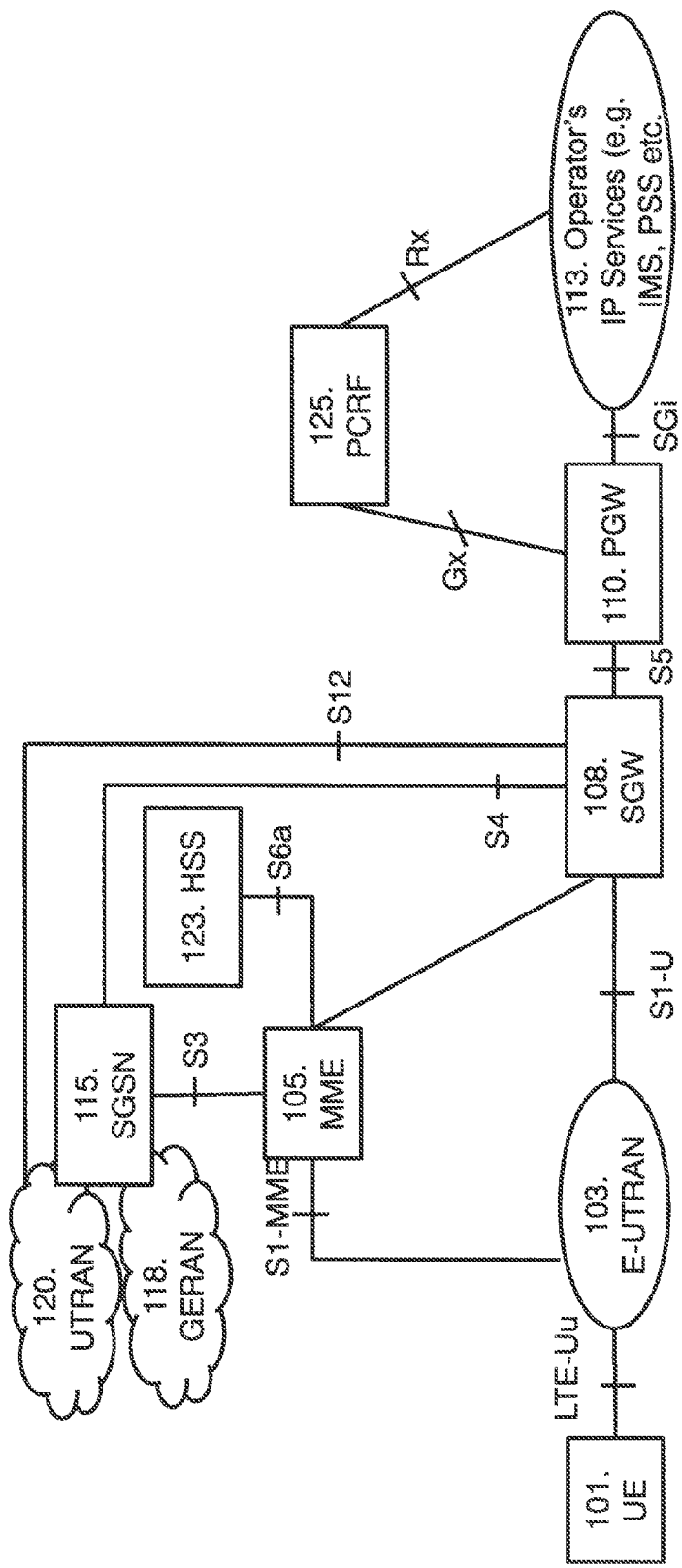
FIG. 1 is a schematic block diagram illustrating embodiments of a non-roaming architecture for 3GPP access.

It should be noted that the communication links between the nodes in the communications system (as seen in FIGS. 1 and 3) may be of any suitable kind including either a wired or wireless link. The link may use any suitable protocol depending on type and level of layer (e.g. as indicated by the Open Systems Interconnection (OSI) model) as understood by the person skilled in the art.

In the existing technology, when the UE 101 provides the ESM information (APN, PCOs or both) of the first PDN connection over E-UTRAN, the UE 101 is not aware of what the supported EPS network feature(s) is/are, e.g. whether IMS voice over PS sessions is supported or not by the network, and what PLMN(s) that are equivalent to the registered PLMN(s).

Figure 2A:
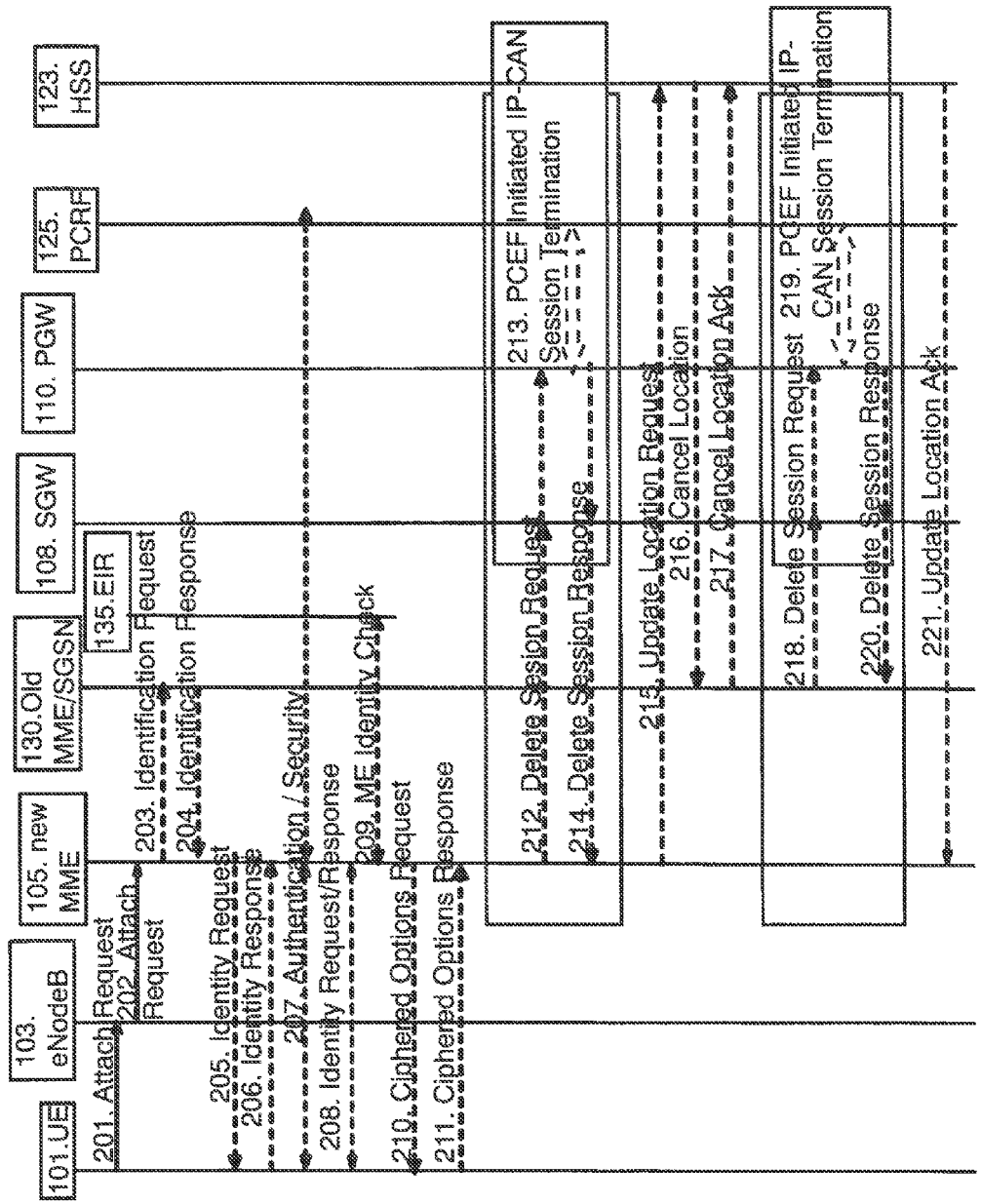

In the existing technology, theses pieces of information above are provided by the MME 105 to the UE 101 in the Attach Accept message (step 228 in FIG. 2b), i.e. after the UE 101 has provided the ESM information (APN, PCOs or both) of the first PDN connection over the E-UTRAN 103 in the ESM Information Response message. See FIGS. 2a and 2b showing the existing message flow.

For the first PDN connection over E-UTRAN, the UE 101 is e.g. unable to indicate well-known IMS parameters such as e.g. APN, "P-CSCF IPv4 Address Request"-PCO, "P-CSCF IPv6 Address Request"-PCO and "IM CN Subsystem Signalling Flag"-PCO only if the IMS voice over PS sessions is supported. P-CSCF is short for Proxy-CSCF and CSCF is short for Call Session Control Function. Furthermore, the UE 101 is e.g. able to indicate the Internet APN only if the UE 101 is not roaming, i.e. only when HPLMN is the registered PLMN or when the HPLMN is equivalent to the registered PLMN.

The limitation above may result in a set up of a PDN connection which the UE 101 does not want, e.g. setup of a PDN connection to the IMS well-known APN when e.g. the IMS voice over PS sessions is not supported. Furthermore, the limitation above may, in addition or instead of the above, result in that that the UE 101 is not creating the first PDN connection over the E-UTRAN 103 to the Internet APN, if the UE 101 wants to establish a PDN connection to Internet APN only when the UE 101 does not roam, i.e. only when HPLMN is the registered PLMN or the HPLMN is equivalent to the registered PLMN.

Thus, with the existing technology, the UE 101 is unable to smartly determine the ESM information (APN, PCOs or both) for the first PDN connection over the E-UTRAN 103 depending on the supported EPS network feature(s) (e.g. whether IMS voice over PS sessions is supported or not); and depending on whether the HPLMN is equivalent to the registered PLMN. Furthermore, the UE 101 is unable to smartly determine the ESM information (APN, PCOs or both) for the first PDN connection over E-UTRAN which may result in creation of an unwated PDN connection for the UE 101.

According to the embodiments herein and in order to enable the UE 101 to smartly determine the ESM information (APN, PCOs or both) for the first PDN connection over E-UTRAN 103, the network (e.g. represented by the MME 105) needs to provide the UE 101 with information needed for smart ESM information determination, e.g. the EPS network feature support information, and the equivalent PLMN information before the UE 101 sends the ESM information to the MME 105.

The UE's 101 inability to smartly determine the ESM information (APN, PCOs or both) for the first PDN connection over E-UTRAN 103 with the existing technology may be resolved by the embodiments herein by that the MME 105 sends the EPS network feature support information and possibly also the equivalent PLMN information before the UE 101 sends the ESM information.

The method for handling ESM information according to some embodiments will now be described with reference to the signaling diagram depicted in FIG. 4. The method comprises the following steps, which steps may as well be carried out in another suitable order than described below.

Step 401

In some embodiments, the UE 101 sends, to the MME 105, an indication of that the UE supports reception of information on which the determination of the ESM information should be based. Such indication may for example be in the form of a flag, where a first value indicates support and a second indicates no support. The first value may be 1 and the second value may be 0, or the first value may be 0 and the second value may be 1. The indication may be sent in a message which may be a request for attach to the network, e.g. an Attach Request message. The indication may be one or more IEs. Note that any other value or content of the indicator is equally applicable.

The indication of that the UE 101 supports reception of the information on which the determination of the ESM information should be based may be comprised in an Attach Request message. The Attach Request message may be a request for attach to a PLMN.

The indication may also be referred to as a Ciphered Options Transfer Flag, a Preliminary Information During Attach (PIDA), Receiving-information for the Smart ESM Information Determination (R-SEID) or similar.

Step 402

The MME 105 sends, to the UE 101, information about at least one supported EPS network feature which the UE 101 may use. Furthermore, information about at least one equivalent PLMN may also be sent by the MME 105 to the UE 101. The equivalent PLMN is equivalent to the PLMN which the UE 101 attempts to register to. The information sent to the UE 101 in step 402 may be referred to as information for smart ESM information determination.

The information in step 401 is sent by the MME 105 to the UE 101 before the UE 101 sends the ESM information to the MME 105, i.e. before step 406.

The supported EPS network feature is a feature supported by the EPS network which the UE 101 may use or have access to. The at least one supported EPS network feature may be at least one of: a RAN feature and a CN feature. The at least one supported EPS network feature may be for example an IMS voice over PS session. The at least one supported EPS network feature may be for example an IMS voice over PS session support indicator and an emergency bearer services indicator.

The information about at least one supported EPS network features and at least one equivalent PLMN may each be comprised in a respective IE.

In addition to the information about the at least one supported EPS network feature, the MME 105 may also send a request for ESM information in step 402.

There are several alternative messages in which the information in step 402 may be sent.

Figure 5A:
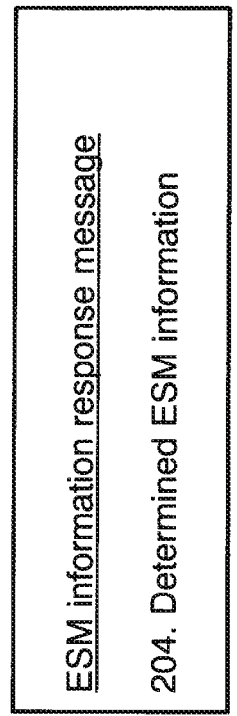
Figure 5A:
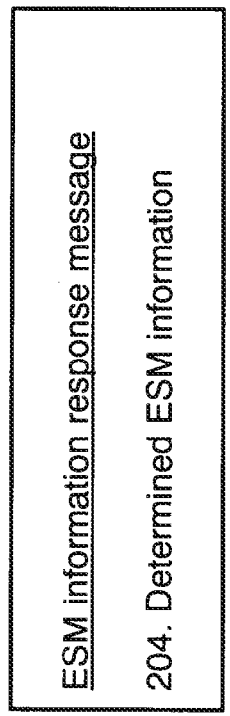
Figure 5B:
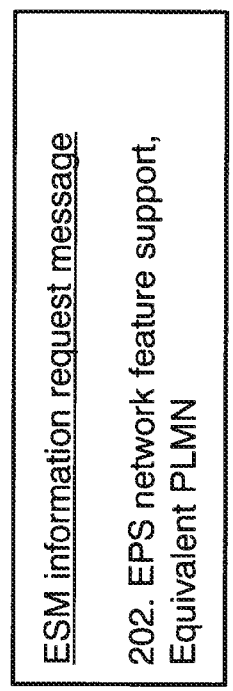
Figure 5B:
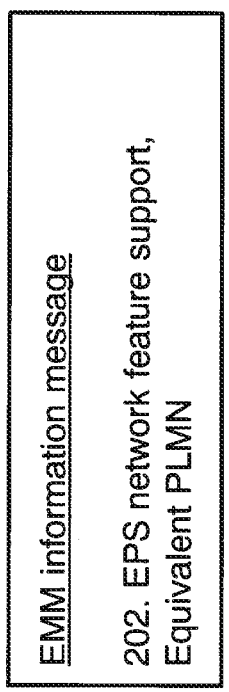

Alternative 1: an ESM Information Request message (FIG. 5*a*).
Alternative 2: an EMM Information message (FIG. 5*b*).
Alternative 3: an ESM Request message (FIG. 5*c*)
Alternative 4: a dedicated EMM message comprised in an ESM Information Request message (FIG. 5*d*).
Alternative 5: an EMM Information message dedicated for the received information comprised in an ESM Information Request message (FIG. 5*e*).

These alternatives will be described in more detail below with reference to FIGS. 5*a*-5*e*.

In some embodiments, even though the information about at least one supported EPS network feature and possibly also information about at least one equivalent PLMN is sent to the UE 101 in step 402 before the UE 101 sends the ESM information to the MME 105, the MME 105 may still send the same information again in an message which is a response to the message in step 401 later on. Such response message may be e.g. Attach Accept message or similar. This means that the information may be sent twice to the UE 101. Note that such Attach Accept message is not illustrated in FIG. 4, but it is similar to the one illustrated in step 228 in FIG. 2*b*. The Attach Accept message is sent after step 406. In another embodiment, the information about at least one supported EPS network feature and possibly also information about at least one equivalent PLMN is only sent once, i.e. in step 402 and not in any Attach Accept message later.

Step 403

Based on the information received in step 402, the UE 101 may determine whether or not it is roaming, e.g. located in a VPLMN, or whether it is at home, e.g. in the HPLMN.

Step 404

Based on the information received in step 402, the UE 101 determines the ESM information for a PDN connection for the UE 101. The PDN connection may be the first PDN connection for the UE 101. The determined ESM information may be at least one of an APN and PCO for the PDN connection.

The decision may also be taken based on whether or not the UE 101 is roaming or at home, which may be determined in step 403 described above.

The UE 101 may have two sets of "profiles" for PDN connection establishment with different parameters (APN, PCO), one set for home and one set for roaming. Depending on whether the UE 101 is home or roaming the UE 101 may base the content of the ESM information on the corresponding "profile".

This determination may also be referred to as a smart ESM information determination. The determination is smart in the sense that it is based on the information received in step 402, i.e. about at least one supported EPS network feature and possibly also at least one equivalent PLMN.

Step 405

In some embodiments, when the UE 101 has previously obtained information about at least one equivalent PLMN and when information about at least one equivalent PLMN was absent in step 402, the UE 101 deletes the previously obtained information about at least one equivalent PLMN.

In some embodiments, when the UE 101 has previously obtained information about at least one equivalent PLMN and when information about at least one equivalent PLMN was present in step 402, the previously obtained information is replaced with the information about at least one equivalent PLMN received in step 402.

Step 406

The UE 101 sends the determined ESM information to the MME 105, i.e. the ESM information determined in step 404, e.g. APN and/or PCO. The determine ESM information may be sent in an ESM Information Response message, also referred to as a Ciphered Options Response message.

Figure 5C:
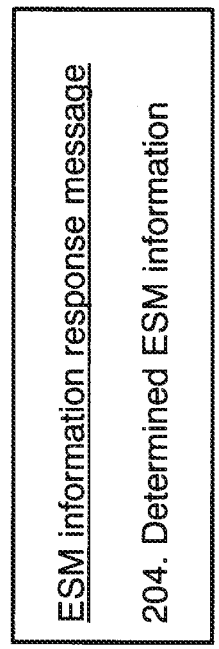
Figure 5C:
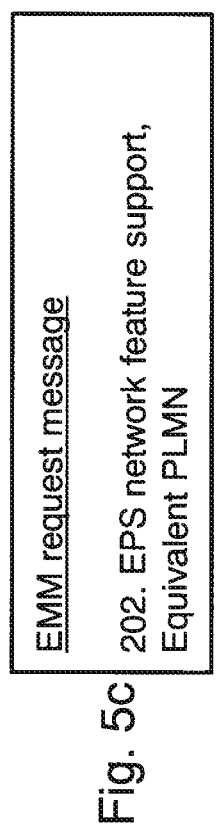
Figure 6:
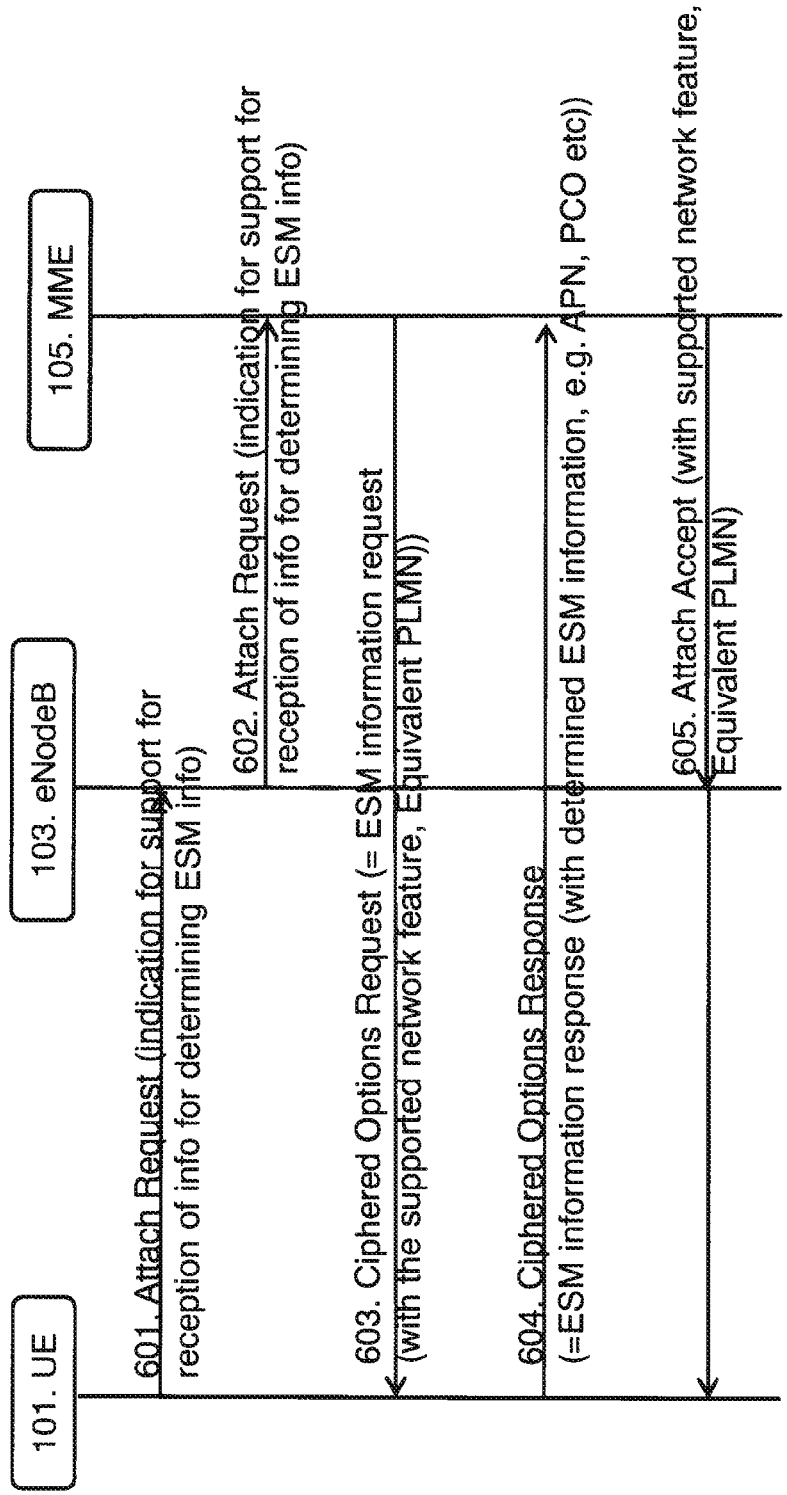
FIG. 6 is a signaling diagram illustrating embodiments of a method of alternative 1.
Figure 7:
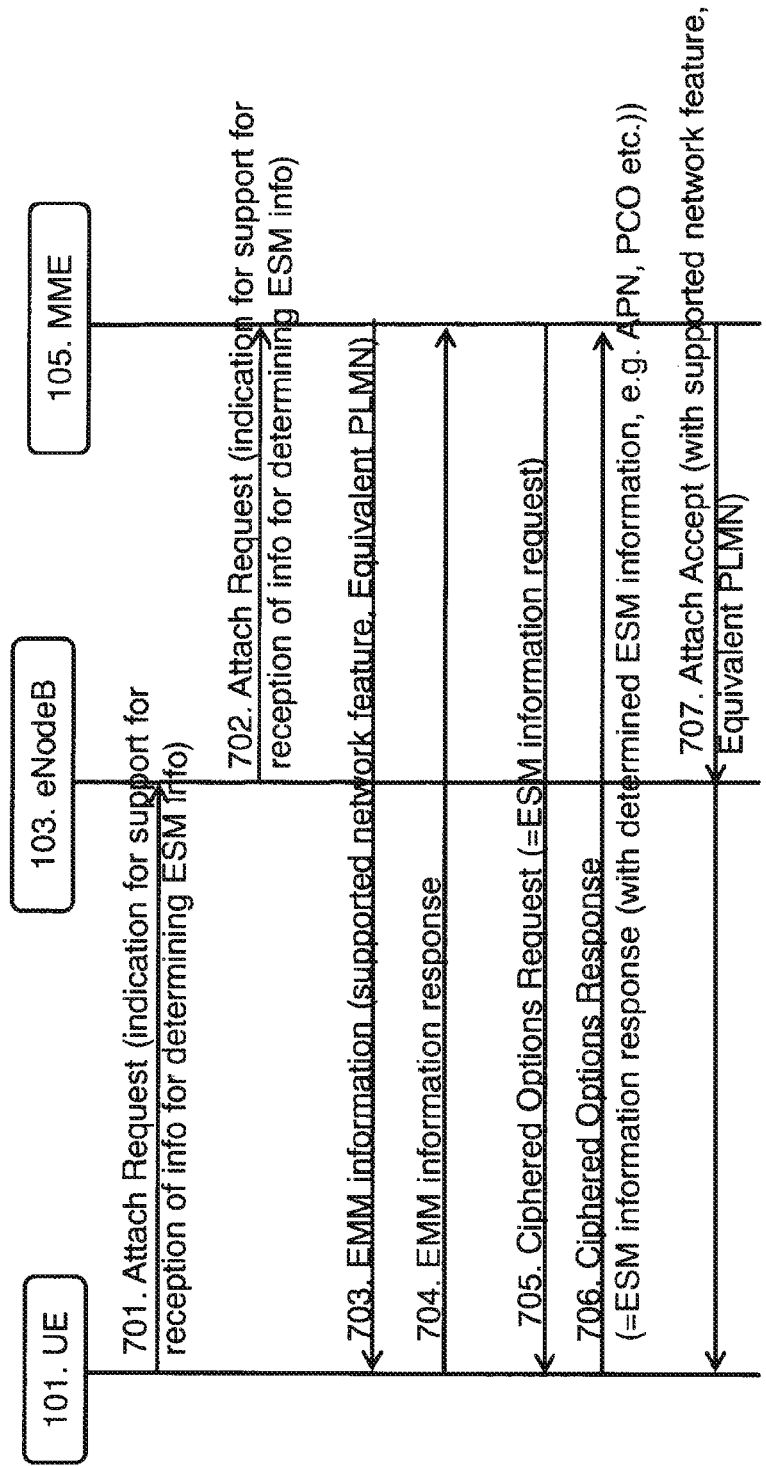
FIG. 7 is a signaling diagram illustrating embodiments of a method of alternative 2.
Figure 8:
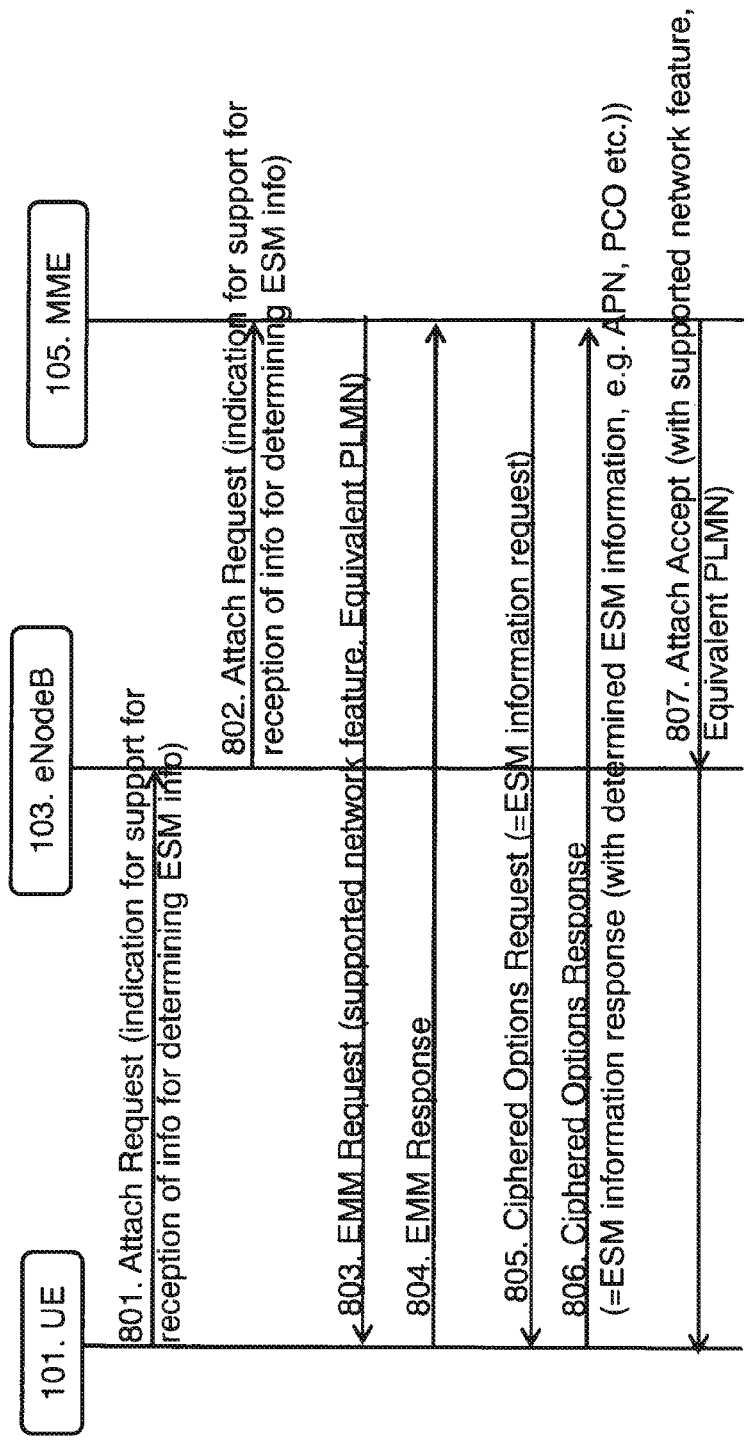
FIG. 8 is a signaling diagram illustrating embodiments of a method of alternative 3.
Figure 9:
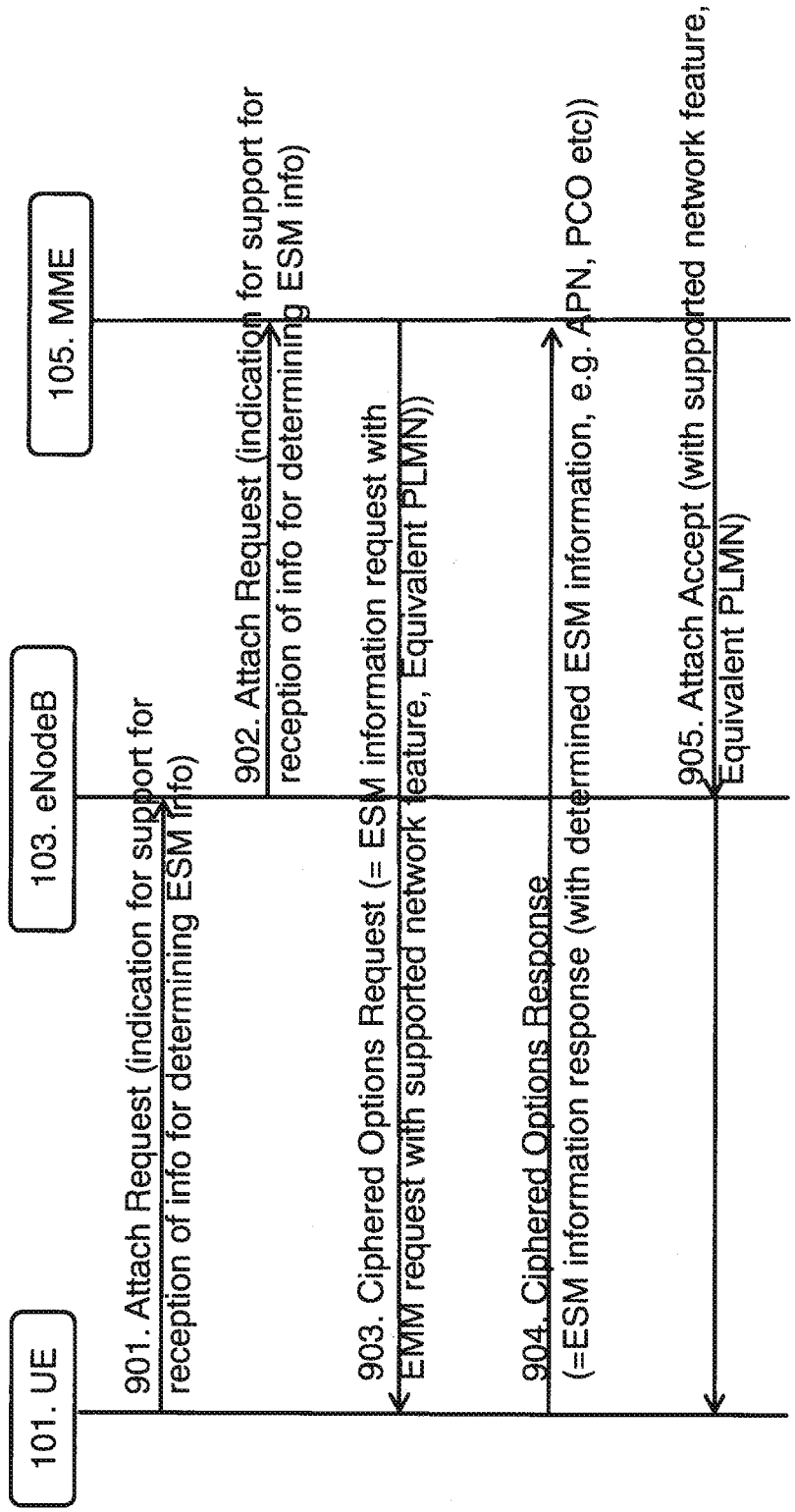
FIG. 9 is a signaling diagram illustrating embodiments of a method of alternative 4.
Figure 10:
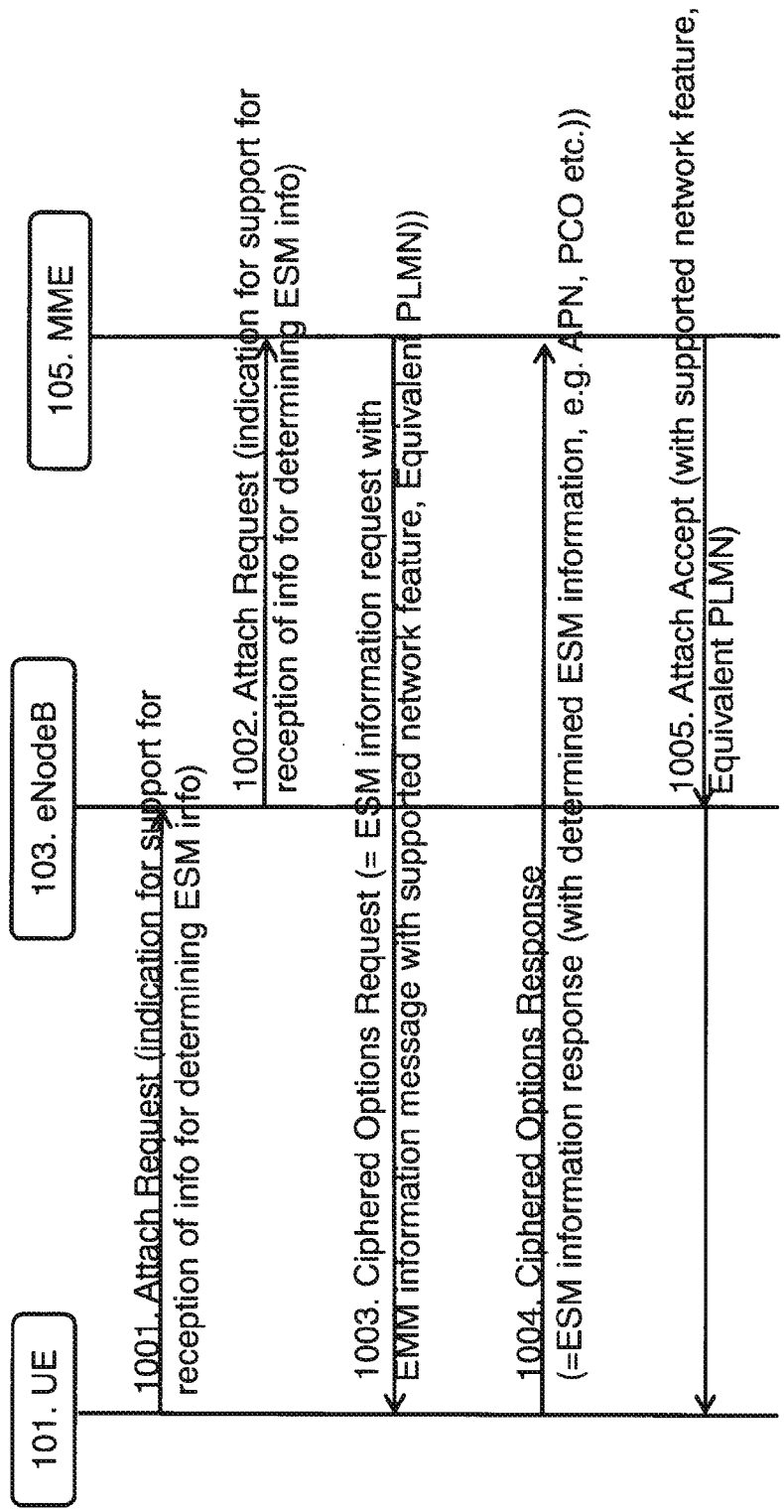
FIG. 10 is a signaling diagram illustrating embodiments of a method of alternative 5.

Each of the alternative embodiments for sending the information in step 402 will now be described in more detail with references to FIGS. 5*a*-*e* and FIGS. 6-10. FIGS. 5*a* and 6 illustrates alternative 1, FIGS. 5*b* and 7 illustrate alternative 2, FIGS. 5*c* and 8 illustrate alternative 3, FIGS. 5*d* and 9 illustrate alternative 4 and FIGS. 5*e* and 10 illustrate alternative 5.

Alternative 1—Sending the Information in an ESM Information Request Message

An embodiment of alternative 1 is seen in FIG. 5*a* and FIG. 6.

Figure 4:
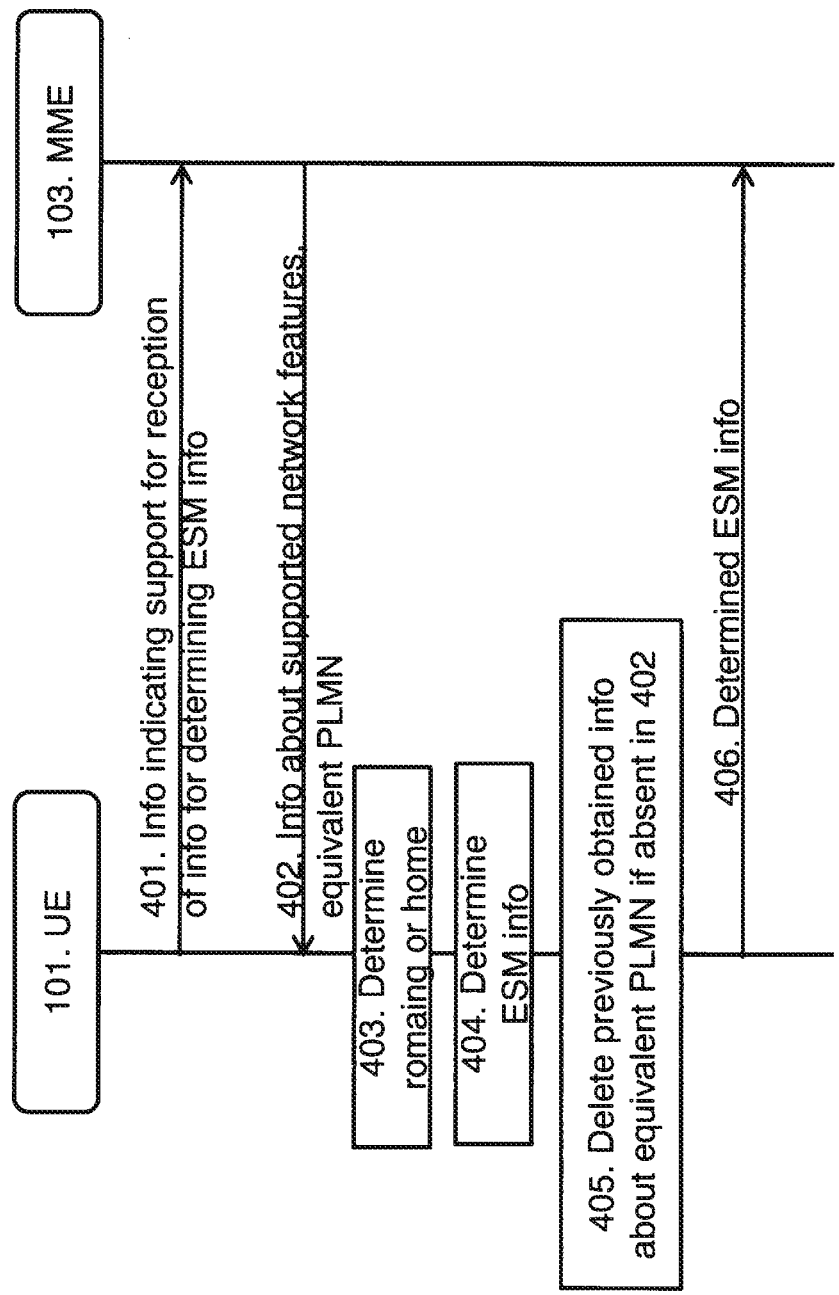
FIG. 4 is a signaling diagram illustrating embodiments of a method.

The UE 101 may indicate support for receiving information for the smart ESM information determination in a UE network capability IE in the Attach Request message in step 401 in FIG. 4. The indication for such support may be referred to as e.g. R-SEID.

If the UE 101 indicates the support for receiving information for the smart ESM information determination (e.g. R-SEID) in the UE network capability IE in the Attach Request message, the MME 105 includes the EPS network feature support information and the equivalent PLMN information (if configured) in the ESM Information Request message, as illustrated in FIG. 5*a*.

The UE 101 may handle the EPS network feature support information and the equivalent PLMN information of the ESM Information Request message as if received in the Attach Accept message and uses the received information for smart determination of the ESM information (APN, PCOs or both) for the first PDN connection over E-UTRAN.

In some embodiments, the MME 105 may send an indication of that it supports Sending-information for the Smart ESM Information Determination (S-SEID). Such MME indication may be sent by the MME 105 to the UE 101 in the ESM Information Request message, e.g. in the EPS network feature support IE.

The UE 101 may be enable to e.g. interpret the meaning of the absence of the equivalent PLMN information. In some embodiments, an indication of that the MME 105 supports sending information for the smart ESM information determination (e.g. S-SEID) may be another requirement for that the UE 101 should be enabled to interpret the meaning of the absence of the equivalent PLMN information. If the equivalent PLMN information is absent in the ESM Information Request message and possibly also if the MME 105 has indicated to the UE 101 that it supports sending of information for the smart ESM information determination, the UE 101 may delete previously stored information about at least one equivalent PLMN (similarly as done in handling the Attach Accept message). If the equivalent PLMN information is present in the ESM Information Request message, the UE 101 does not necessarily perform any action on the stored information about at least one equivalent PLMN. The stored information of at least one equivalent PLMN may be comprised in a memory unit internally within the UE 101 or in an external memory unit which is external to the UE 101 and which the UE 101 has access to obtain information from. The information is stored in any suitable form or structure for organizing information such as e.g. a list, a tree structure, a linked list etc.

An embodiment for the method according to alternative 1 is shown in FIG. 6. The method comprises the following steps, which steps may be performed in any other suitable order than the one described below:

Step 601 and 602

These steps correspond to step 401 in FIG. 4. The UE 101 may send an indication of that the UE supports reception of information to be used when determining ESM information. The indication may be sent in an Attach Request message. The Attach Request message may be sent via the eNodeB 103 as illustrated in FIG. 6.

The indication may be referred to as R-SEID. If R-SEID comprises for example a first number it indicates that receiving IEs for the smart ESM information determination is not supported. If R-SEID comprises for example a second number it indicates that receiving IEs for the smart ESM information determination is supported. The first number may be 1 and the second number may be 0, or the first number may be 0 and the second number may be 1. Note that any other value or content of the indicator is equally applicable.

Steps similar to steps 203-209 in FIG. 2a may be performed after step 602 and before step 603, but are not illustrated in FIG. 6 for the sake of simplicity.

Step 603

This step corresponds to step 402 in FIG. 4. The MME 105 sends information about the at least one supported EPS network feature and possibly also at least one equivalent PLMN to the UE 101. The information may be sent in an ESM Information Request message, also referred to as a Ciphered Options Request message. An example of a supported EPS network feature may be an IMS voice over PS Session. The information sent to the UE 101 in step 603 may be referred to as "information for smart ESM information determination".

The information about the at least one supported EPS network features may be comprised in an IE and intends to inform the UE 101 about the EPS network support for certain features. The information about at least one equivalent PLMN may be comprised in an IE. The information about the at least equivalent PLMN is sent to the UE 101 in order to assign at new equivalent PLMN information to the UE 101.

If the UE 101 indicates, in the Attach Request message, support for receipt of the information to be used when determining the ESM information, and possibly also if the MME 105 also supports such information, the following may take place:

- If the MME 105 is configured with information about the at least one supported EPS network feature, the MME 105 includes the supported EPS network feature information in the ESM Information Request message in step 603.
- If the MME 105 is not configured with the supported EPS network feature information, the MME 105 may indicate that there are no supported EPS network features in the ESM Information message in step 603.
- If the MME 105 is not configured with the supported EPS network feature information, the MME 105 may not indicate anything to the UE in step 603.

If the UE 101 indicates, e.g. in the Attach Request message, support for receipt of the information to be used when determining the ESM information, and possibly also if the MME 105 also supports such information, the following may take place:

- If the MME 105 is configured with information about at least one equivalent PLMN, the MME 105 may include the equivalent PLMN information in the ESM Information Request message in step 603.
- If the MME 105 is not configured with the equivalent PLMN information, the MME 105 may indicate to the UE 101 that there is no equivalent PLMN in the ESM Information message in step 603.
- If the MME 105 is not configured with the equivalent PLMN information, the MME 105 does not indicate anything to the UE 101 in step 603.

In some embodiments, even though the information about at least one supported EPS network feature and possibly also information about at least one equivalent PLMN is sent to the UE 101 in step 603 before the UE 101 sends the ESM information to the MME 105, the MME 105 may still send the same information again in an Attach Accept message or similar later on. This means that the information may be sent twice to the UE 101. Note that such Attach Accept message is not illustrated in FIG. 6, but it is similar to step 228 illustrated in FIG. 2b. The Attach Accept message is sent after step 605. In another embodiment, the information about at least one supported EPS network feature and possibly also information about at least one equivalent PLMN is only sent once, i.e. only in step 603 and not in any Attach Accept message later on.

The UE 101 may determine whether it is roaming or not based on the information in the ESM Information Request message. When the UE 101 is not roaming, it may be home, i.e. in coverage of or attached to the HPLMN. The UE 101 determines the ESM information as in step 403 in FIG. 4, but this step is not shown in FIG. 6. The ESM information may be determined based on whether the UE 101 is roaming or at home and based on the information in the ESM Information Request message. The determination performed by the UE 101 may be referred to as "smart ESM information determination", where the term "smart" relates to that the UE 101 takes the decision on the received information which leads to a result that is adapted to the UE 101 and its needs and request and the correspondence with the network.

Furthermore, step 404 of FIG. 4 may also be performed after step 603, but this step is neither shown in FIG. 6.

Step 604

This step corresponds to step 406 in FIG. 4. The UE 101 sends the determined ESM information (the determination step is not illustrated in FIG. 6) to the MME 105, e.g. APN and/or PCO. The determined ESM information may be sent in an ESM Information Response message, also referred to as a Ciphered Options Response message. This step is performed after step 603.

Steps similar to steps 212-221 in FIG. 2a and steps 222-227 in FIG. 2b may be performed after step 604 and before step 605, but are not illustrated in FIG. 6 for the sake of simplicity.

Step 605

In some embodiments, the MME 105 sends, to the UE 101 via the eNodeB 103, a response to the message sent in step 601, e.g. an Attach Accept message, comprising information about the supported EPS network features and possibly also information about at least one equivalent PLMN. The eNodeB 103 forwards the message to the UE 101. Thus, the information about the supported EPS network features and possibly also information about at least one equivalent PLMN may be sent to the UE 101 both in steps 603 and 605.

Steps similar to steps 229-241 in FIG. 2b may be performed after step 605, but are not illustrated in FIG. 6 for the sake of simplicity.

So, for embodiments of alternative 1 if the UE 101 indicates support for receiving information for the smart ESM information determination in the UE network capability IE of the Attach Request message, and possibly also if the MME 105 supports sending information for the smart ESM information determination, the MME 105 may inform the UE 101 about the support for specific features in the EPS network feature support information and the MME 105 may also include information about at least one equivalent PLMN in the ESM Information Request message. The information about at least one equivalent PLMN may be in the form of a list, a tree structure, a linked list etc. Each entry in the information about at least one equivalent PLMN may comprise a respective PLMN code (Mobile Country Code (MCC) and Mobile Network Code (MNC)).

The UE 101 supports receiving information for the smart ESM information determination, and the EPS network feature support information may be comprised in the ESM Information Request message. The ESM Information Request message may indicate that the MME 105 supports sending information for the smart ESM information determination. If information about at least one equivalent PLMN is comprised in the equivalent PLMN information of the ESM Information Request message, the UE 101 may store the information as provided by the MME 105, and if the attach procedure is not for emergency bearer services, the UE 101 may remove from the information any PLMN code that is already in the information about "forbidden PLMNs" or in the information about "forbidden PLMNs for GPRS service". In addition, the UE 101 may add to the stored information the PLMN code of the registered PLMN that sent the information. The UE may replace the stored information on each receipt of the ESM Information Request message. If the ESM Information message does not comprise such information, then the UE 101 may delete the stored information.

In a UE 101 with e.g. IMS voice over PS capability, the IMS voice over PS session support indicator and the emergency bearer services indicator indicated in the EPS network feature support information may be provided to the upper layers. The EPS network feature support information is received in the NAS layer of the UE 101, so the upper layers may be the IMS layer.

In a UE 101 with Location Service (LCS) capability, location services indicators (Evolved Packet Core-LCS (EPC-LCS), Circuit Switched-LCS (CS-LCS)) indicated in the EPS network feature support information element may be provided to the upper layers. Note that the upper layers may use the information above to determine ESM information (APN, PCOs or both) comprised in the ESM Information Response message.

Alternative 2—Sending the Information in a Reliable EMM Information Message

Embodiments of alternative 2 is illustrated in FIG. 5b and FIG. 7.

In alternative 2, an EMM information procedure is extended to enable the MME 105 to provide the UE 101 with the EPS network feature support information and possibly also the equivalent PLMN information before the UE 101 sends the ESM information to the MME 105. The equivalent PLMN information and the EPS network feature support information are provided to the UE 101 in the EMM Information message.

The UE 101 may indicate support for receiving information for the smart ESM information determination (e.g. the R-SEID) and support for reliable EMM information procedure in e.g. the Attach Request message.

If the UE 101 indicated the support for receiving information for the smart ESM information determination (e.g. the R-SEID) and if the UE 101 indicated support for a reliable EMM information procedure, the MME 105 includes the EPS network feature support information and possibly also the equivalent PLMN information in an EMM Information message. This indicates that the EMM Information message is to be confirmed by an EMM Information Response message and sends the EMM Information message reliably (i.e. re-sends it until the EMM Information Response message is received). A reliable procedure is a procedure that is acknowledged by the receiver so that the sender knows that the information/request has reached the receiver. The MME 105 may also indicate support for sending information for the smart ESM information determination (e.g. the S-SEID) in the EPS network feature support information in the ESM Information Request message.

If the UE 101 receives the EMM Information message with the indication that it is to be confirmed by EMM Information Response message, the UE 101 sends an EMM Information Response message to the MME 105.

If the MME 105 indicates the support for sending information for the smart ESM information determination (e.g. the S-SEID) in the EPS network feature support information of the EMM Information message, the UE 101 handles the EPS network feature support information and the equivalent PLMN information received in the EMM Information message similarly as when they are received in the Attach Accept message and uses the information for smart determination of the ESM information (APN, PCOs or both) for the first PDN connection over E-UTRAN 103.

An embodiment of the method according to alternative 2 is shown in FIG. 7. The method comprises the following steps, which steps may be performed in any other suitable order than the one described below:

Step 701 and 702

These steps correspond to step 401 in FIG. 4 and steps 601 and 602 in FIG. 6. The UE 101 may send an indication of that the UE 101 supports reception of information to be used when determining ESM information. The indication may be sent in an Attach Request message. The Attach Request message may be sent via the eNodeB 103 as illustrated in FIG. 7.

The indication sent in steps 701 and 702 may be comprised in an IE, such as the R-SEID. If the IE comprises a first number it indicates that the Receiving IEs for the smart ESM information determination is not supported by the UE 101 and the second number indicates that the Receiving information for the smart ESM information determination is supported by the UE 101. The first number may be 1 and the second number may be 0, or the first number may be 0 and the second number may be 1. Note that any other value or content of the indicator is equally applicable.

Furthermore, the UE 101 may send an indication to the MME 105 regarding the support for a reliable EMM information procedure. Such capability may be referred to a "Reliable EMM information procedure" capability, abbreviated REIP. If the capability comprises for example a first number it indicates that the Reliable EMM information procedure is not supported by the UE 101 and a second number may indicate that the Reliable EMM information procedure is supported by the UE 101. The first number may be 1 and the second number may be 0, or the first number may be 0 and the second number may be 1. Note that any other value or content of the indicator is equally applicable.

Steps similar to steps 203-209 in FIG. 2a may be performed after step 702 and before step 703, but are not illustrated in FIG. 7 for the sake of simplicity.

Step 703

This step corresponds to step 402 in FIG. 4. The MME 105 sends information about the supported EPS network features and possibly also information about at least one equivalent PLMN to the UE 101. The information may be sent in an EMM Information message. The information sent to the UE 101 in step 703 may be referred to as information for smart ESM information determination.

The information about at least one equivalent PLMN may be sent to the UE 101 in order to assign new equivalent PLMN information to a UE 101. The information about at least one equivalent PLMN may be comprised in an IE.

The information about the supported EPS network feature may be sent to the UE 101 to inform the UE 101 of the support for certain features supported by the EPS network. The supported EPS network feature may be comprised in an IE.

In addition, the MME 105 may send information to indicate that an EMM information response is required. The purpose of this information may be to indicate whether MME 105 requests the UE 101 to send an EMM Information Response message back to the MME 105. The information may be comprised in an IE in the EMM Information message. For example, the first value of the response required information may indicate that the MME 105 does not request the UE 101 to send an EMM Information Response message. For example, the second value of the response required information may indicate that the MME 105 requests the UE 101 to send the EMM Information Response message to the MME 105. The first value may be 1 and the second value may be 0, or the first value may be 0 and the second value may be 1. Note that any other value or content of the indicator is equally applicable.

If the UE 101 indicates, e.g. in the Attach Request message, support for receipt of the information to be used when determining the ESM information, and possibly if the MME 105 also supports such information the following may take place:

If the MME 105 is configured with information about the supported EPS network features, the MME 105 includes the supported EPS network feature information in the ESM Information Request message in step 703.

If the MME 105 is not configured with the supported EPS network feature information, the MME 105 may indicate that there are no supported EPS network features in the ESM Information message in step 703.

If the MME 105 is not configured with the supported EPS network feature information, the MME 105 may not indicate anything to the UE 101 in step 703.

If the UE 101 indicates, in the Attach Request message, support for receipt of the information to be used when determining the ESM information, and possibly if the MME 105 also supports such information the following may take place:

If the MME 105 is configured with information about at least one equivalent PLMN, the MME 105 may include the equivalent PLMN information in the ESM Information Request message to the UE 101 in step 703.

If the MME 105 is not configured with the equivalent PLMN information, the MME 105 may indicate to the UE 101 that there is no equivalent PLMNs in the ESM Information message in step 703.

If the MME 105 is not configured with the equivalent PLMN information, the MME 105 may not indicate anything to the UE 101 in step 703.

In some embodiments, even though the information about at least one supported EPS network feature and possibly also information about at least one equivalent PLMN is sent to the UE 101 in step 703 before the UE 101 sends the ESM information to the MME 105 in step 406, the MME 105 may still send the same information again in an Attach Accept message or similar later on. This means that the information may be sent twice to the UE 101. Note that such Attach Accept message is not illustrated in FIG. 7, but it is similar to the one illustrated in step 228 in FIG. 2b. The Attach Accept message is sent after step 707. In another embodiment, the information about at least one supported EPS network feature and possibly also information about at least one equivalent PLMN is only sent once, i.e. in step 703 and not also in any Attach Accept message later.

When the UE 101 receives the EMM Information message, the UE 101 sends the EMM Information Response message and the UE 101 determines whether it is roaming or at home based on the information in the EMM Information message.

The UE 101 determines the ESM information as in step 404 in FIG. 4, but this step is not shown in FIG. 7. As mentioned earlier, the determination performed by the UE 101 may also be referred to as "smart ESM information determination". Furthermore, step 405 of FIG. 4 may also be performed after step 703, but this step is neither shown in FIG. 7. The determination of the ESM information may be performed after step 703, after step 704 or after step 705, but before step 706.

The MME 105 may send the EMM Information message in step 703 before sending the ESM Information Request message/Ciphered Options Request message in step 705.

The sending of the EMM Information message may start a timer, e.g. T3470. In some embodiments, the trigger for starting the timer is when the EMM Information message comprises an EMM information response required IE indicating that the MME 105 requests the UE 101 to send EMM Information Response message.

Step 704

This step corresponds to step 406 in FIG. 4. The UE 101 sends an EMM information response to the MME 105. The EMM Information Response message may be sent either before or after the determination of the ESM information. The EMM Information Response message in step 704 may be sent in response to the EMM Information message in step in step 703.

Upon receipt of the EMM Information Response message, the MME 105 may stop a timer, e.g. the timer referred to as T3470. The reliable EMM information procedure may be supervised by the MME 105 by using the timer. The MME 105 may, on the first expiry of the timer, re-send the EMM Information message and reset and restart the timer. This retransmission may be repeated e.g. four times, i.e. on the fifth expiry of the timer, the MME 105 may abort the reliable EMM information procedure.

Step 705

The MME 105 sends an ESM Information Request message (also referred to as a Ciphered Options Request message) to the UE 101. In alternative 2, the ESM Information Request message is an initiation of a procedure where the UE 101 may provide information to the MME 105 in the response message, i.e. the ESM Information Response message or the Ciphered Options Response message.

The MME 105 may wait with sending of ESM Information Request message until reception of the EMM Information Response message from the UE 101.

Step 706

This step corresponds to step 405 in FIG. 4 and step 604 in FIG. 6. The UE 101 sends the determined ESM information (the determination step is not illustrated in FIG. 7) to the MME 105, e.g. APN and/or PCO. The determined ESM information may be sent in an ESM Information Response message, also referred to as a Ciphered Options Response message.

Steps similar to steps 212-221 in FIG. 2a and steps 222-227 in FIG. 2b may be performed after step 706 and before step 707, but are not illustrated in FIG. 7 for the sake of simplicity.

Step 707

This step corresponds to step 605 in FIG. 6. In some embodiments, the MME 105 sends, to the UE via the eNodeB 103, an Attach Accept message comprising information about the supported EPS network features and possibly also information about at least one equivalent PLMN. The eNodeB 103 forwards the Attach Accept message to the UE 101.

Steps similar to steps 229-241 in FIG. 2b may be performed after step 707, but are not illustrated in FIG. 7 for the sake of simplicity.

So, if the UE 101 supports receiving information for the smart ESM information determination, the UE 101 may be ready to receive an EMM Information message possibly at any time whilst in EMM registered initiated mode. The EPS network feature support information may be comprised and may also indicate that the MME 105 supports sending information for the smart ESM information determination.

If the equivalent PLMN information is comprised in the EMM Information message, the UE 101 may store the information as provided by the MME 105, and if the EMM Information message is not received during attach procedure for emergency bearer services, the UE 101 may remove from the information any PLMN code that is already in the information about "forbidden PLMNs" or in the information about "forbidden PLMNs for GPRS service". In addition, the UE 101 may add to the stored information the PLMN code of the registered PLMN that sent the information. The UE 101 may replace the stored information on each receipt of the EMM Information message. If the EMM Information message does not comprise such information, then the UE 101 may delete the stored information.

In a UE 101 with IMS voice over PS capability, the IMS voice over PS session support indicator and the emergency bearer services indicator may be provided to the upper layers.

In a UE 101 with LCS capability, location services indicators (EPC-LCS, CS-LCS) may be provided to the upper layers. Note that the upper layers may use the information above to determine the ESM information (APN, PCOs or both) comprised in the ESM Information Response message. If the UE 101 supports a reliable EMM information procedure, and the information about a required EMM information response is comprised in the EMM Information message and possibly also indicates that the MME 105 requests the UE 101 to send the EMM Information Response message, the UE 101 shall send the EMM Information Response message to the MME 105.

Alternative 3—Sending the Information Using a Procedure with an EMM Message

An embodiment of alternative 3 is seen in FIG. 5c and FIG. 8.

The UE 101 may indicate support for receiving information for the smart ESM information determination (e.g. R-SEID) in the UE network capability information of e.g. the Attach Request message.

If the UE 101 indicated the support for receiving information for the smart ESM information determination (e.g. the R-SEID), the MME 105 sends an EMM Request message dedicated for the supported EPS network feature information and possibly also information about at least one equivalent PLMN. In some embodiments, the dedicated EMM Request message may be referred to as an Information for Smart ESM Information Determination Request message or similar.

If the UE 101 receives the dedicated EMM Request message from the MME 105, e.g. Information for Smart ESM Information Determination Request message, the UE 101 sends a dedicated EMM response message which is a response to the dedicated EMM Request message. The dedicated EMM Response message may be referred to as the Information for Smart ESM Information Determination Response message or similar.

The UE 101 handles the supported EPS network feature information and possibly also the equivalent PLMN information in the dedicated EMM Request message, e.g. the Information for Smart ESM Information Determination Request message similarly as when they are received in the Attach Accept message and uses the information for smart determination of the ESM information (APN, PCOs or both) for the first PDN connection over E-UTRAN.

An embodiment for the method according to alternative 3 is shown in FIG. 8. The method comprises the following steps, which steps may be performed in any other suitable order than the one described below:

Step 801 and 802

These steps correspond to step 401 in FIG. 4 and steps 601 and 602 in FIG. 6 and steps 701 and 702 in FIG. 7. The UE 101 may send an indication of that the UE 101 supports reception of information to be used when determining ESM information. The indication may be sent in an Attach Request message. The Attach Request message may be sent via the eNodeB 103 as illustrated in FIG. 8. The indication may be comprised in UE network capability information in the Attach Request message. The indication may be in the form of an IE and may be referred to as an R-SEID capability. If the indicator has for example the first value it may indicate that Receiving Information for the smart ESM information determination is not supported by the UE 101. If the IE has for example the second value it may indicate that Receiving Information for the smart ESM information determination is supported by the UE 101. The first value may be 1 and the second value may be 0, or the first value may be 0 and the second value may be 1. Note that any other value or content of the indicator is equally applicable.

Steps similar to steps 203-209 in FIG. 2a may be performed after step 802 and before step 803, but are not illustrated in FIG. 8 for the sake of simplicity.

Step 803

This step corresponds to step 402 in FIG. 4. The MME 105 sends information about the supported EPS network features and possibly also the equivalent PLMNs to the UE 101. The information may be sent in a dedicated EMM Request message. The dedicated EMM Request message may be a NAS message. The information sent to the UE 101 in step 803 may be referred to as information for smart ESM information determination.

If the UE 101 indicates support for receipt of the information to be used when determining the ESM information in the Attach Request message, and possibly also if the MME 105 also supports such information the following may take place:
- If the MME 105 is configured with information about the supported EPS network features, the MME 105 includes the supported EPS network feature information in the ESM Information Request message in step 803.
- If the MME 105 is not configured with the supported EPS network feature information, the MME 105 may indicate to the UE 101 that there are no supported EPS network features in the ESM Information message in step 803.
- If the MME 105 is not configured with the supported EPS network feature information, the MME 105 may not indicate anything to the UE in step 803.

If the UE 101 indicates support for receipt of the information to be used when determining the ESM information in the Attach Request message, and possibly if the MME 105 also supports such information the following may take place:
- If the MME 105 is configured with information about at least one equivalent PLMN, the MME 105 may include the equivalent PLMN information in the ESM Information Request message in step 803.
- If the MME 105 is not configured with the equivalent PLMN information, the MME 105 may indicate that there is no equivalent PLMNs in the ESM Information message in step 803. However, the message may be sent regardless.
- If the MME 105 is not configured with the equivalent PLMN information, the MME 105 may not indicate anything to the UE in step 803.

The information about at least one equivalent PLMN may be comprised in an IE, and this information may be sent to the UE 101 in order to assign new equivalent PLMN information to the UE 101.

The information about the EPS network feature support may be comprised in an IE. The MME 101 may send this information to the UE 101 to inform the UE 101 of the support for certain features. If this information is not comprised then the UE 101 may interpret this as a receipt of an information element with all bits of the value part coded as zero.

The MME 105 sends the dedicated EMM Request message in step 803 before sending the ESM Information Request message in step 805.

In some embodiments, even though the information about at least one supported EPS network feature and possibly also information about at least one equivalent PLMN is sent to the UE 101 in step 803 before the UE 101 sends the ESM information to the MME 105, the MME 105 may still send the same information again in an Attach Accept message or similar later on. This means that the information may be sent twice to the UE 101. Note that such Attach Accept message is not illustrated in FIG. 8, but it is similar to step 228 illustrated in FIG. 2b. The Attach Accept message is sent after step 807. In another embodiment, the information about at least one supported EPS network feature and possibly also information about at least one equivalent PLMN is only sent once, i.e. in step 803 and not also in any Attach Accept message later.

When the UE 101 receives the EMM Request message, the UE 101 sends the EMM Response message (step 804). The UE 101 determines whether it is roaming or at home based on the information in the EMM Request message. The UE 101 determines the ESM information based on the roaming situation and on the information in the EMM Request message. As mentioned earlier, the determination performed by the UE 101 may also be referred to as "smart ESM information determination".

The UE 101 determines the ESM information as in step 404 in FIG. 4, but this step is not shown in FIG. 8. Furthermore, step 405 of FIG. 4 may also be performed after step 703, but this step is neither shown in FIG. 8. The determination of the ESM information may be performed after step 803, after step 804 or after step 805, but before step 806.

The UE 101 may determine the ESM information either before or after sending the EMM Response message in step 804.

Step 804

The UE 101 sends a dedicated EMM Response message to the MME 105. The dedicated EMM Response message is a response to the EMM Request message in step 803 and comprises a confirmation of that the EMM Request message in step 803 has been successfully received by the UE 101. The dedicated EMM Response message may be a NAS message.

Step 805

The MME 105 sends the ESM Information Request message (also referred to as a Ciphered Options Request message) to the UE 101.

The MME 105 may wait with sending of the ESM Information Request message until reception of the EMM Response message from UE 101 in step 804.

Step 806

This step corresponds to step 406 in FIG. 4 and step 604 in FIG. 6 and step 706 in FIG. 7. The UE 101 sends the determined ESM information (the determination step is not illustrated in FIG. 8) to the MME 105, e.g. APN and/or PCO. The determined ESM information may be sent in an ESM Information Response message, also referred to as a Ciphered Options Response message.

Steps similar to steps 212-221 in FIG. 2a and steps 222-227 in FIG. 2b may be performed after step 806 and before step 807, but are not illustrated in FIG. 8 for the sake of simplicity.

Step 807

This step corresponds to step 605 in FIG. 6 and step 707 in FIG. 7. In some embodiments, the MME 105 sends, to the UE 101 via the eNodeB 103, an Attach Accept message comprising the at least one supported EPS network feature and possibly also information about at least one equivalent PLMN. The eNodeB 103 forwards the Attach Accept message to the UE 101.

Steps similar to steps 229-241 in FIG. 2*b* may be performed after step 807, but are not illustrated in FIG. 8 for the sake of simplicity.

The purpose of the information for the smart ESM information determination procedure described in alternative 3 is to enable the MME 105 to provide the UE 101 with information, possibly in the form of IEs, for the smart determination of the ESM information provided by the UE 101 during the ESM information request procedure.

If the UE 101 indicated support for the receiving information for the smart ESM information determination e.g. in the UE network capability IE of the Attach Request message in step 801, and e.g. after NAS signaling security was established and before invoking an ESM information request procedure, the MME 105 may invoke the information for the smart ESM information determination procedure.

The MME 105 may initiate the information for the smart ESM information determination procedure by sending an Information for Smart ESM Information Determination Request message to the UE 101 and possibly by also starting a timer. The timer may be referred to as T3470.

The MME 105 may include information about least one equivalent PLMN in the Information for Smart ESM Information Determination Request message. Each entry in the information may comprise a PLMN code (e.g. MCC and MNC).

The MME 105 may inform the UE 101 about the support for specific features, such as IMS voice over PS session, location services (EPC-LCS, CS-LCS) or emergency bearer services, in the EPS network feature support information.

The UE 101 may be ready to respond to an Information for Smart ESM Information Determination Request message at any time whilst in EMM registered initiated mode.

Upon receipt of the Information for Smart ESM Information Determination Request message, the UE 101 may send an Information for Smart ESM Information Determination Response message to the MME 105.

If information about at least one equivalent PLMN is comprised in the Information for Smart ESM Information Determination Request message, the UE 101 may store the information as provided by the MME 105, and if the information for smart ESM information determination procedure is not invoked during attach procedure is for emergency bearer services, the UE 101 may remove from the information any PLMN code that is already in the information about "forbidden PLMNs" or in the information about "forbidden PLMNs for GPRS service". In addition, the UE 101 may add to the stored information the PLMN code of the registered PLMN that sent the information. The UE 101 may replace the stored information on each receipt of the Information for Smart ESM Information Determination Request message. If the Information for Smart ESM Information Determination Request message does not contain such information, then the UE 101 may delete the stored information.

In a UE 101 with e.g. IMS voice over PS capability, the IMS voice over PS session support indicator and the emergency bearer services indicator may be provided to the upper layers. In a UE 101 with LCS capability, location services indicators (EPC-LCS, CS-LCS) may be provided to the upper layers. Note that the upper layers may use the information above to determine the ESM information (APN, PCOs or both) comprised in the ESM Information Response message.

Upon receipt of the Information for Smart ESM Information Determination Response message, the MME 105 may stop the timer, e.g. the T3470 timer.

Upon detection of a lower layer failure before the Information for Smart ESM Information Determination Response message is received, the MME 105 may abort any ongoing EMM procedure. A lower layer may be the layers below the NAS layer, i.e. the RRC layer and below. From the MME 105 point of view it may correspond to the eNode B 103. A lower layer failure may be that something ended abnormally before completion, for example due to radio link failure (i.e. the UE 101 has lost coverage in the middle of the procedure).

The information for the smart ESM information determination procedure may be supervised by the MME 105 by the timer, e.g. T3470. The MME 105 may, on the first expiry of the timer, re-send the Information for Smart ESM Information Determination Request message and reset and restart the timer. This retransmission may be repeated four times, i.e. on the fifth expiry of the timer, the MME 105 may abort the information for the smart ESM information determination procedure and any ongoing EMM procedure.

If the MME 105 receives an Attach Request message before the ongoing information for the smart ESM information determination procedure has been completed and no attach procedure is pending on the network (i.e. no Attach Accept/Reject message has still to be sent as an answer to an Attach Request message), the MME 105 may proceed with the attach procedure. If the MME 105 receives an Attach Request message before the ongoing information for the smart ESM information determination procedure has been completed and an attach procedure is pending (i.e. an Attach Accept/Reject message has to be sent as an answer to an earlier Attach Request message), then:

If the information in the Attach Request message differ from the information received within the previous Attach Request message, the MME 105 may proceed with the new attach procedure; or If the information does not differ, then the MME 105 may not treat this new Attach Request message any further.

If the MME 105 receives a Detach Request message before the ongoing information for the smart ESM information determination procedure has been completed, the MME 105 may abort the procedure for smart ESM information determination and the MME 105 may progress the detach procedure.

If the MME 105 receives a Detach Request message before the ongoing procedure for the smart ESM information determination has been completed, the MME 105 may complete the procedure for smart ESM information determination and may respond to the detach procedure.

If the MME 105 receives a Tracking Area Update Request message before the ongoing procedure for the smart ESM information determination has been completed, the MME 105 may progress both procedures.

If the MME 105 receives an Extended Service Request message for CS fallback or 1×CS fallback before the ongoing procedure for smart ESM information determination has been completed, the MME 105 may progress both procedures.

If the Information for Smart ESM Information Determination Request message could not be delivered due to an intra MME handover and the target Tracking Area (TA) is comprised in the TAI information, then upon successful completion of the intra MME handover the MME 105 may re-send the Information for Smart ESM Information Request message. If a failure of the handover procedure is reported by the lower layer and the S1 signaling connection exists, the MME 105 may re-send the Information for Smart ESM Information Determination Request message.

Alternative 4—Including a EMM Message in the ESM Information Request Message

An embodiment of alternative 4 is seen in FIG. 5d and FIG. 9.

Embodiments of alternative 4 introduces an EMM procedure which enables the MME 105 to provide the UE 101 with the EPS network feature support information and optionally the equivalent PLMN information before the UE 101 sends the ESM information to the MME 105. The equivalent PLMN information and the EPS network feature support information may be provided to the UE 101 in the Information for Smart ESM Information Determination message. The Information for Smart ESM Information Determination message may be piggybacked in the EMM message container IE of the ESM Information Request message.

The UE 101 may indicate support for receiving information for the smart ESM information determination (e.g. the R-SEID) in the UE network capability IE of the Attach Request message.

If the UE 101 indicated support for receiving information for the smart ESM information determination (e.g. the R-SEID), the MME 105 sends the dedicated EMM Request message (also referred to as Information for Smart ESM Information Determination message) comprising the EPS network feature support information and possibly also the equivalent PLMN information to the UE 101. The Information for Smart ESM Information Determination message may be comprised (e.g. piggybacked) in the ESM Information Request message.

If the UE 101 receives an ESM Information Request message comprising an Information for Smart ESM Information Determination message, the UE 101 handles the EPS network feature support information and possibly also the equivalent PLMN information received in the Information for Smart ESM Information Determination message similarly as when they are received in the Attach Accept message uses the information for smart determination of the ESM information (APN, PCOs or both) for the first PDN connection over E-UTRAN.

An embodiment of the method according to alternative 4 is shown in FIG. 9. The method comprises the following steps, which steps may be performed in any other suitable order than the one described below:

Step 901 and 902

These steps correspond to step 401 in FIG. 4, steps 601 and 602 in FIG. 6, steps 701 and 702 in FIG. 7 and steps 801 and 802 in FIG. 8. The UE 101 may send an indication of that the UE 101 supports reception of information to be used when determining ESM information. The indication may be sent in an Attach Request message. The Attach Request message may be sent via the eNodeB 103 as illustrated in FIG. 9.

If the UE 101 indicates support for receiving information for the smart ESM information determination for example in the UE network capability IE of the Attach Request message, the MME 105 may include an EMM message container IE in the ESM Information Request message and set it to an Information for Smart ESM Information Determination message.

Steps similar to steps 203-209 in FIG. 2a may be performed after step 902 and before step 903, but are not illustrated in FIG. 8 for the sake of simplicity.

Step 903

The MME 105 sends information about the supported EPS network features and possibly also information about at least one equivalent PLMN to the UE 101. The information may be sent in a dedicated EMM Request message, and the dedicated EMM request message may be comprised in the ESM Information Request message, also referred to as a Ciphered Options Request message. The information sent to the UE 101 in step 402 may be referred to as information for smart ESM information determination. The MME 105 may initiate the procedure for smart ESM information determination by sending an Information for Smart ESM Information Determination message to the UE 101. The Information for Smart ESM Information Determination message may be piggybacked in the EMM message container IE of the ESM Information Request message.

The MME 105 may include information about at least one equivalent PLMN in the Information for Smart ESM Information Determination message. Each entry in the information may comprise a PLMN code (e.g. at least one of an MCC and an MNC). The MME 105 may inform the UE 101 about the support for specific features, such as IMS voice over PS session, location services (EPC-LCS, CS-LCS) or emergency bearer services, in the EPS network feature support information.

This information in step 903 is sent by the MME 105 to the UE 101 to provide the UE 101 with information useful for determination of ESM information provided by the UE 101 in the ESM Information Response message.

The information about at least one equivalent PLMN may be comprised in an IE. This IE may be sent to the UE 101 in order to assign new equivalent PLMNs information to the UE 101.

The information about the EPS feature network support may be comprised in an IE. The MME 105 may include this IE to inform the UE 101 of the support for certain features. If this IE is not included then the UE 101 may interpret this as a receipt of an information element with all bits of the value part coded as zero.

If the UE 101 indicates, e.g. in the Attach Request message, support for receipt of the information to be used when determining the ESM information, and possibly if the MME 105 also supports such information the following may take place:

If the MME 105 is configured with information about the supported EPS network features, the MME 105 includes the supported EPS network feature information in the ESM Information Request message in step 903.

If the MME 105 is not configured with the supported EPS network feature information, the MME 105 may indicate that there are no supported EPS network features in the ESM Information message in step 903.

If the MME 105 is not configured with the supported EPS network feature information, the MME 105 may not indicate anything to the UE 101 in step 903.

If the UE 101 indicates support for receipt of the information to be used when determining the ESM information in the Attach Request message, and possibly also if the MME 105 also supports such information the following may take place:

If the MME 105 is configured with information about at least one equivalent PLMN, the MME 105 may include the equivalent PLMN information in the ESM Information Request message in step 903.

If the MME 105 is not configured with the equivalent PLMN information, the MME 105 may indicate that there is no equivalent PLMNs in the ESM Information message in step 903.

If the MME 105 is not configured with the equivalent PLMN information, the MME 105 may not indicate anything to the UE 101 in step 903.

The dedicated EMM message may be comprised in an EMM message container. One purpose of the EMM message container IE may be to enable piggybacked transfer of a single EMM message within an ESM message. The EMM message comprised in this IE may be coded for example without a NAS security header. The EMM message container may be a type 6 information element.

In some embodiments, even though the information about at least one supported EPS network feature and possibly also information about at least one equivalent PLMN is sent to the UE 101 in step 903 before the UE 101 sends the ESM information to the MME 105, the MME 105 may still send the same information again in an Attach Accept message or similar later on. This means that the information may be sent twice to the UE 101. Note that such Attach Accept message is not illustrated in FIG. 9, but it is similar to step 228 illustrated in FIG. 2b. The Attach Accept message is sent after step 905. In another embodiment, the information about at least one supported EPS network feature and possibly also information about at least one equivalent PLMN is only sent once, i.e. in step 903 and not also in any Attach Accept message later.

Upon receipt of the ESM Information Request message, if the UE 101 indicates support for receiving information for the smart ESM information determination e.g. in the UE network capability IE of the Attach Request message, and the ESM Information Request message comprises an EMM message container IE comprising an Information for Smart ESM Information Determination message, the UE 101 may handle the Information for Smart ESM Information Determination message.

The UE 101 determines the ESM information as in step 404 in FIG. 4, but this step is not shown in FIG. 9. As mentioned earlier, the determination performed by the UE 101 may also be referred to as "smart ESM information determination". Furthermore, step 405 of FIG. 4 may also be performed after step 903, but this step is neither shown in FIG. 9. The determination of the ESM information may be performed after step 903 and before step 904.

Step 904

This step corresponds to step 406 in FIG. 4, step 604 in FIG. 6, step 706 in FIG. 7 and step 806 in FIG. 8.

The UE 101 sends the determined ESM information (the determination step is not illustrated in FIG. 9) to the MME 105, e.g. APN and/or PCO. The determine ESM information may be sent in an ESM Information Response message, also referred to as a Ciphered Options Response message.

The UE 101 may be ready to handle an Information for Smart ESM Information Determination message at any time e.g. whilst in EMM registered initiated mode.

If the equivalent PLMN information is comprised in the Information for Smart ESM Information Determination message, the UE 101 may store the information as provided by the MME 105. If the information for the smart ESM information determination procedure is not invoked during attach procedure is for emergency bearer services, the UE 101 may remove from the information any PLMN code that is already in the information about "forbidden PLMNs" or in the list of "forbidden PLMNs for GPRS service". In addition, the UE 101 may add to the stored information the PLMN code of the registered PLMN that sent the information. The UE 101 may replace the stored information on each receipt of the Information for Smart ESM Information Determination message. If the Information for Smart ESM Information Determination message does not contain any information, then the UE 101 may delete the stored information.

In a UE 101 with e.g. IMS voice over PS capability, the IMS voice over PS session support indicator and the emergency bearer services indicator may be provided to the upper layers. In a UE 101 with LCS capability, location services indicators (e.g. EPC-LCS, CS-LCS) may be provided to the upper layers. Note that the upper layers may use the information above to determine ESM information (APN, PCOs or both) comprised in the ESM Information Response message.

Steps similar to steps 212-221 in FIG. 2a and steps 222-227 in FIG. 2b may be performed after step 904 and before step 905, but are not illustrated in FIG. 9 for the sake of simplicity.

Step 905

This step corresponds to step 605 in FIG. 6, step 707 in FIG. 7 and step 807 in FIG. 8. In some embodiments, the MME 105 sends, to the UE 101 via the eNodeB 103, an Attach Accept message comprising the information about at least one supported EPS network features and possibly also information about at least one equivalent PLMN. The eNodeB 103 forwards the Attach Accept message to the UE 101.

Steps similar to steps 229-241 in FIG. 2b may be performed after step 905, but are not illustrated in FIG. 9 for the sake of simplicity.

A purpose of the information for the smart ESM information determination procedure may be to enable the MME 105 to provide the UE 101 with information for the smart determination of the ESM information performed by the UE 101 during the procedure for ESM information request. If the UE indicated support for receiving information for the smart ESM information determination in the UE network capability IE of the Attach Request message, the MME 105 may invoke the information for the smart ESM information determination procedure.

Alternative 5—including EMM Information message in ESM Information Request message An embodiment of alternative 5 is illustrated in FIG. 5e and FIG. 10.

In embodiments of alternative 5, an EMM information procedure is extended to enable the MME 105 to provide the UE 101 with the equivalent PLMN information and the EPS network feature support information before the UE 101 sends the ESM Information Response message. The equivalent PLMN information and the EPS network feature support information may be provided to the UE 101 in the EMM Information message. The EMM Information message may be piggybacked in the EMM message container IE of the ESM Information Request message.

The UE 101 may indicate support for receiving information for the smart ESM information determination (e.g. the R-SEID) for example in the UE 101 network capability IE of the Attach Request message.

If the UE 101 indicated support for receiving information for the smart ESM information determination (e.g. the R-SEID), the MME 105 sends an EMM Information message comprising the supported EPS network feature information and possibly also the equivalent PLMN information to the UE 101. The MME 105 may also indicate support for sending information for the smart ESM information determination (e.g. the S-SEID) in the supported EPS network feature information in the ESM Information Request message. The EMM Information message may be comprised (piggybacked) in the EMS Information Request message.

If the UE 101 receives an ESM Information Request message comprising an EMM Information message, and if the EMM Information message comprises the supported EPS network feature information indicating support for sending information for the smart ESM information determination (S-SEID), the UE 101 handles the supported EPS network feature information and possibly also the equivalent PLMN information received in the EMM Information message similarly as when they are received in the Attach Accept message and uses the information for smart determination of the ESM information (e.g. APN, PCOs or both) for the first PDN connection over E-UTRAN.

An embodiment for the method according to alternative 5 is shown in FIG. 10. The method comprises the following steps, which steps may be performed in any other suitable order than the one described below:

Step 1001 and 1002

These steps correspond to step 401 in FIG. 4, steps 601 and 602 in FIG. 6, steps 701 and 702 in FIG. 7, steps 801 and 802 in FIG. 8 and steps 901 and 902 in FIG. 9. The UE 101 may send an indication of that the UE supports reception of information to be used when determining ESM information. The indication may be sent in an Attach Request message. The Attach Request message may be sent via the eNodeB 103 as illustrated in FIG. 10.

The indication may be referred to as a Receiving information for the smart ESM information determination (e.g. the R-SEID) capability. If the indication has the first value it may indicate that receiving IEs for the smart ESM information determination is not supported by the UE 101. If the indication has the second value it may indicate that receiving IEs for the smart ESM information determination is supported by the UE 101. The first value may be 1 and the second value may be 0, or the first value may be 0 and the second value may be 1. Note that any other value or content of the indicator is equally applicable.

Steps similar to steps 203-209 in FIG. 2a may be performed after step 1002 and before step 1003, but are not illustrated in FIG. 10 for the sake of simplicity.

Step 1003

This step corresponds to step 402 in FIG. 4. The MME 105 sends information about the supported EPS network features and possibly also about at least one equivalent PLMN to the UE 101. The information may be sent in a dedicated EMM Information message, and the dedicated EMM Information message may be comprised in the ESM Information Request message, also referred to as a Ciphered Options Request message. The information sent to the UE 101 in step 1003 may be referred to as information for smart ESM information determination.

The information about at least one equivalent PLMN may be sent to the UE 101 in order to assign a new equivalent PLMNs list to the UE 101. The information about the at least one supported EPS network feature may be comprised in an IE. The MME 105 may include this IE to inform the UE 101 of the support for certain features.

In some embodiments, the information about the at least one supported EPS network feature may comprise an indication of that the MME 105 supports sending information for the smart ESM information determination. Such indication may be for example the S-SEID. If the indication has e.g. the first value it may indicate that the MME 105 does not support sending information for the smart ESM information determination. If the indication has e.g. the second value it may indicate that the MME 105 supports sending information for the smart ESM information determination. The first value may be 1 and the second value may be 0, or the first value may be 0 and the second value may be 1. Note that any other value or content of the indicator is equally applicable.

If the UE 101 indicates, e.g. in the Attach Request message, support for receipt of the information to be used when determining the ESM information, and possibly also if the MME 105 supports such information the following may take place:

If the MME 105 is configured with information about the supported EPS network features, the MME 105 may include the supported EPS network feature information in the ESM Information Request message in step 1003.

If the MME 105 is not configured with the supported EPS network feature information, the MME 105 may indicate that there are no supported EPS network features in the ESM Information message in step 1003.

If the MME 105 is not configured with the supported EPS network feature information, the MME 105 may not indicate anything to the UE 101 in step 1003.

If the UE 101 indicates, e.g. in the Attach Request message, support for receipt of the information to be used when determining the ESM information, and possibly also if the MME 105 also supports such information the following may take place:

If the MME 105 is configured with information about at least one equivalent PLMN, the MME 105 may include the equivalent PLMN information in the ESM Information Request message in step 1003.

If the MME 105 is not configured with the equivalent PLMN information, the MME 105 may indicate that there is no equivalent PLMNs in the ESM Information message in step 1003.

If the MME 105 is not configured with the equivalent PLMN information, the MME 105 may not indicate anything to the UE in step 1003.

If the UE 101 indicates support for receiving information for the smart ESM information determination e.g. in the UE network capability IE of the Attach Request message, the MME 105 may include an EMM message container IE in the ESM Information Request message and send it in a EMM Information message.

If the UE 101 supports receiving information for the smart ESM information determination, the UE 101 may be ready to receive an EMM Information message at any time e.g. whilst in EMM registered initiated mode.

The UE 101 supports receiving information for the smart ESM information determination, and the EPS network feature support information is comprised and possibly also indicates that the MME 105 supports sending information for the smart ESM information determination:

If the equivalent PLMN information is comprised in the EMM Information message, the UE 101 may store the information as provided by the MME 105, and if the EMM Information message is not received during e.g. an attach procedure for emergency bearer services, the UE 101 may remove from the information any PLMN code that is already in the information about "forbidden PLMNs" or in the information about "forbidden PLMNs for GPRS service". In addition, the UE 101 may add to the stored information the PLMN code of the registered PLMN that sent the information. The UE 101 may replace the stored list on each receipt of the EMM Information message. If the EMM Information message does not contain such information, then the UE 101 may delete the stored information.

In a UE 101 with e.g. IMS voice over PS capability, the IMS voice over PS session support indicator and the emergency bearer services indicator may be provided to the upper layers. In a UE 101 with LCS capability, location services indicators (e.g. EPC-LCS, CS-LCS) may be provided to the upper layers. Note that the upper layers may use the information above to determine ESM information (APN, PCOs or both) included in the ESM Information Response message.

In some embodiments, even though the information about at least one supported EPS network feature and possibly also information about at least one equivalent PLMN is sent to the UE 101 in step 1003 before the UE 101 sends the ESM information to the MME 105, the MME 105 may still send the same information again later on, e.g. in an Attach Accept message or similar. This means that the information may be sent twice to the UE 101. Note that such Attach Accept message is not illustrated in FIG. 10, but it is similar to step 228 illustrated in FIG. 2b. The Attach Accept message is sent after step 1005. In another embodiment, the information about at least one supported EPS network feature and possibly also information about at least one equivalent PLMN is only sent once, i.e. in step 1003 and not also in any Attach Accept message later.

Upon receipt of the ESM Information Request message, if the UE 101 indicates support for receiving information for the smart ESM information determination e.g. in the UE network capability IE of the Attach Request message and the ESM Information Request message comprises a EMM message container IE comprising an EMM Information message, the UE 101 may handle the EMM Information message. The UE 101 may handle the received message by determining the ESM information as in step 404 in FIG. 4, but this step is not shown in FIG. 10. Furthermore, step 404 of FIG. 4 may also be performed after step 1003, but this step is neither shown in FIG. 10. The determination of the ESM information may be performed after step 1003 and before step 1004. As mentioned earlier, the determination performed by the UE 101 may also be referred to as "smart ESM information determination".

The purpose of the EMM message container information element may be to enable piggybacked transfer of a single EMM message within an ESM message. The EMM message comprised in this IE may be coded without NAS security header. The EMM message container may be a type 6 information element.

Step 1004

This step corresponds to step 406 in FIG. 4, step 604 in FIG. 6, step 706 in FIG. 7, step 806 in FIG. 8 and step 904 in FIG. 9. The UE 101 sends the determined ESM information (the determination step is not illustrated in FIG. 10) to the MME 105, e.g. APN and/or PCO. The determine ESM information may be sent in an ESM Information Response message, also referred to as a Ciphered Options Response message.

Steps similar to steps 212-221 in FIG. 2a and steps 222-227 in FIG. 2b may be performed after step 1004 and before step 1005, but are not illustrated in FIG. 10 for the sake of simplicity.

Step 1005

This step corresponds to step 605 in FIG. 6, step 707 in FIG. 7, step 807 in FIG. 8 and step 905 in FIG. 9. In some embodiments, the MME 105 sends, to the UE 101 via the eNodeB 103, an Attach Accept message comprising information about at least one supported EPS network features and possibly also information about at least one equivalent PLMN. The eNodeB 103 forwards the Attach Accept message to the UE 101.

Steps similar to steps 229-241 in FIG. 2b may be performed after step 1005, but are not illustrated in FIG. 10 for the sake of simplicity.

Figure 11:
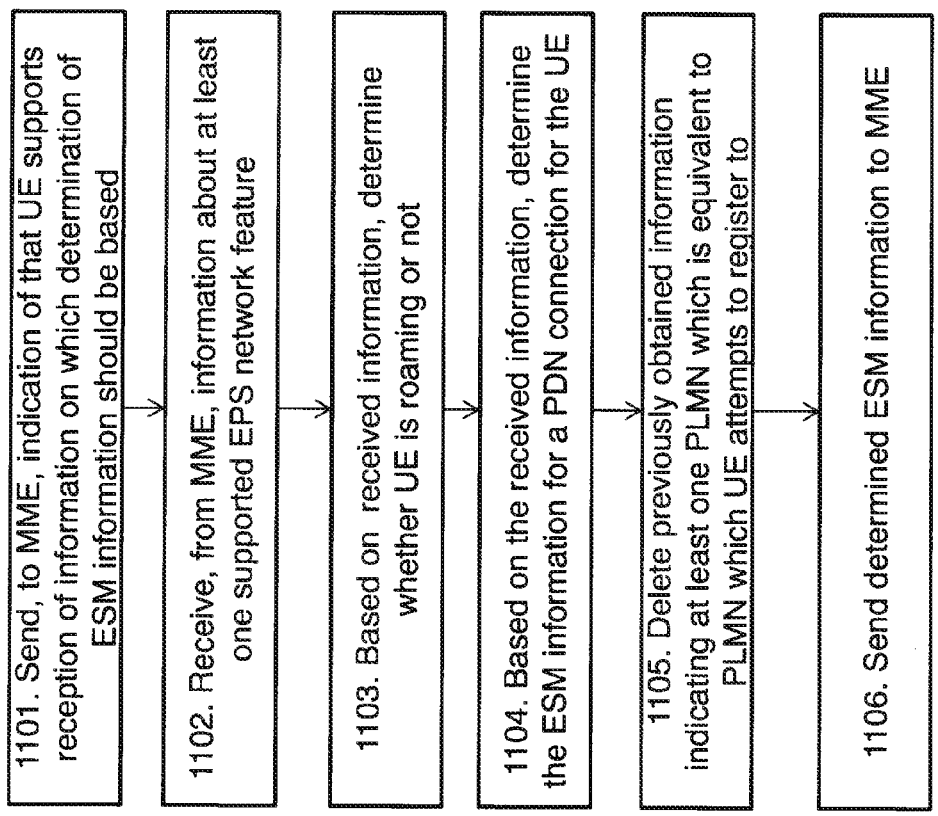
FIG. 11 is a flow chart illustrating embodiments of a method performed by the UE.

The method described above will now be described seen from the perspective of the UE 101. FIG. 11 is a flowchart describing the present method in the UE 101 for handling ESM information. As mentioned above, the UE 101 supports reception of information to be used in determination of the ESM information. The method comprises the further steps to be performed by UE 101, which steps may be performed in any other suitable order than described below:

Step 1101

This step corresponds to step 401 in FIG. 4, steps 601 and 602 in FIG. 6, steps 701 and 702 in FIG. 7, steps 801 and 802 in FIG. 8, steps 901 and 902 in FIG. 9 and steps 1001 and 1002 in FIG. 10. In some embodiments, the UE 101 sends, to the MME 105, an indication of that the UE 101 supports reception of the information on which the determination of the ESM information should be based.

In some embodiments, the indication of that the UE 101 supports reception of the information on which the determination of the ESM information should be based is comprised in an attach request message. The attach request message may be a request for attach to a PLMN.

Step 1102

This step corresponds to step 402 in FIG. 4, step 603 in FIG. 6, step 703 in FIG. 7, step 803 in FIG. 8, step 903 in FIG. 9 and step 1003 in FIG. 10. The UE receives, from the MME 105, information about at least one supported EPS network feature which the UE 101 may use. The information is received before the UE 101 sends ESM information to the MME 105.

The at least one supported EPS network feature may be at least one of RAN feature and a CN feature.

In some embodiments, the received information further comprises information about at least one PLMN which is equivalent to the PLMN which the UE 101 attempts to register to.

In some embodiments, the received information is comprised in a ESM information request message. In some embodiments, the received information is comprised in an EMM information message. In some embodiments, the received information is comprised in an EMM request message dedicated for the received information. In some embodiments, the received information is comprised in an EMM message dedicated for the information. The dedicated EMM message may be comprised in an ESM information request message. In some embodiments, the received information is comprised in an EMM information message dedicated for the received information. The EMM information message may be comprised in an ESM information request message.

Step 1103

This step corresponds to step 403 in FIG. 4. In some embodiments, based on the received information, the UE 101 determines whether the UE 101 is roaming or not.

Step 1104

This step corresponds to step 404 in FIG. 4. Based on the received information, the UE 101 determines the ESM information for a PDN connection for the UE 101. The determined ESM information may be at least one of an APN and a PCO parameter.

In some embodiments, the ESM information for the PDN connection for the UE 101 is determined further based on whether the UE 101 is roaming or not.

Step 1105

This step corresponds to step 404 in FIG. 4. In some embodiments, the UE 101 has previously obtained information indicating at least one PLMN which is equivalent to the PLMN to which the UE 101 attempts to register to. When the information indicating at least one PLMN which is equivalent to the PLMN to which the UE 101 attempts to register to is absent in the information received from the MME 105, the UE may delete the previously obtained information indicating the at least one PLMN which is equivalent to the PLMN which the UE 101 attempts to register to. The UE 101 may attempt to register to the PLMN by sending an attach request message.

Step 1106

This step corresponds to step 406 in FIG. 4, step 604 in FIG. 6, step 706 in FIG. 7, step 806 in FIG. 8, step 904 in FIG. 9 and step 1004 in FIG. 10. The UE 101 sends the determined ESM information to the MME 105.

In some embodiments, the determined ESM information is sent in an ESM information response message. In some embodiments, the determined ESM information is sent in an ESM information response message. In some embodiments, the determined ESM information is sent in an ESM information response message. In some embodiments, the determined ESM information is sent in an ESM information response message. In some embodiments, the determined ESM information is sent in an ESM information response message.

Figure 12:
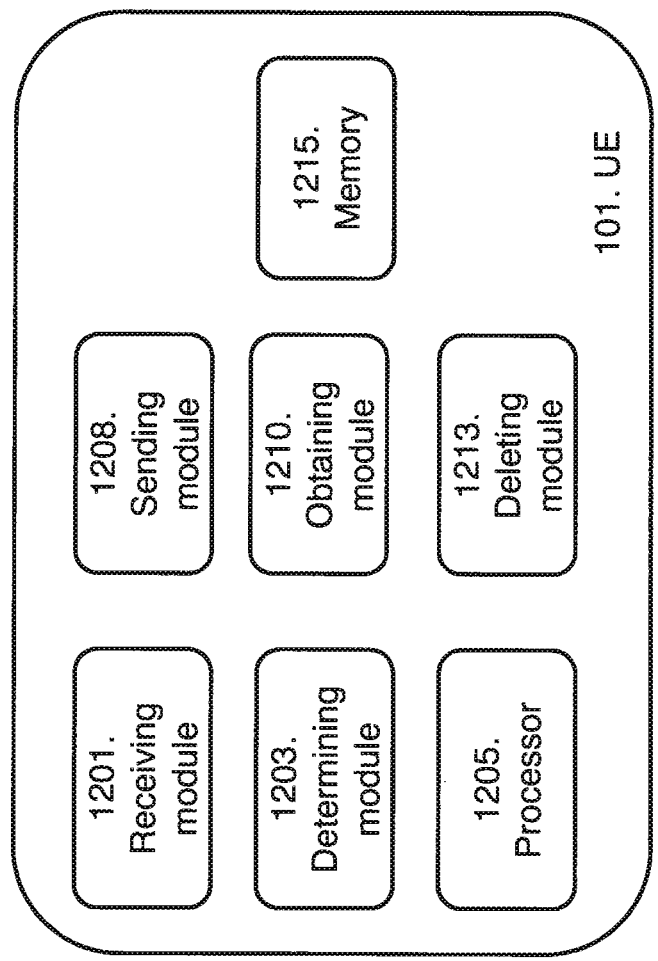
FIG. 12 is a schematic block diagram illustrating embodiments of a UE.

Embodiments of the UE 101 configured to perform the method actions for handling ESM information, as described above in relation to FIG. 11 is depicted in FIG. 12. The UE 101 is configured to support reception of information to be used in determination of the ESM information.

The UE 101 is configured to, e.g. by means of a receiving module 1201, receive, from the MME 105, information about at least one supported EPS network feature which the UE 101 may use. The information is received before the UE 101 sends ESM information to the MME 105. The at least one supported EPS network feature may be at least one of: a RAN feature and a CN feature. The received information may further comprise information about at least one PLMN which is equivalent to the PLMN which the UE 101 attempts to register to. The receiving module 1201 may also be referred to as a receiving unit, a receiving means, a receiving circuit, means for receiving or an input unit. The receiving unit 1201 may be a receiver, a transceiver etc. The receiving module 1201 may be a wireless receiver of the UE 101 of a wireless or fixed communications system.

The received information may be comprised in an ESM information request message. The received information may be comprised in an EMM information message. The received information may be comprised in an EMM request message dedicated for the received information. The received information may be comprised in an EMM message dedicated for the information. The dedicated EMM message may be comprised in an ESM information request message. The received information may be comprised in an EMM information message dedicated for the received information. The EMM information message may be comprised in an ESM information request message.

The UE 101 is configured to, e.g. by means of a determining module 1203, based on the received information, determine the ESM information for a PDN connection for the UE 101. The determined ESM information may be at least one of an APN and a PCO. The determining module 1203 may be a processor 1205 of the UE 101. The determining module 1203 may also be referred to as a determining unit, a determining means, a determining circuit, means for determining etc.

The UE 101 is further configured to, e.g. by means of a sending module 1208, send the determined ESM information to the MME 105. The determined ESM information may be sent in an ESM information response message. The determined ESM information may be sent in an ESM information response message. The determined ESM information may be sent in an ESM information response message. The determined ESM information may be sent in an ESM information response message. The determined ESM information may be sent in an ESM information response message. The sending module 1208 may also be referred to as a sending unit, a sending means, a sending circuit, means for sending or an output unit. The sending unit 1208 may be a transmitter, a transceiver etc. The sending module 1208 may be a wireless transmitter of the UE 101 of a wireless or fixed communications system.

The UE 101 may be further configured to, e.g. by means of the sending module 1208, send, to the MME 105, an indication of that the UE 101 supports reception of the information on which the determination of the ESM information should be based. The indication of that the UE 101 supports reception of the information on which the determination of the ESM information should be based may be comprised in an attach request message. The attach request message may be a request for attach to a PLMN.

The UE 101 may be further configured to, e.g. by means of the determining module 1203, based on the received information, determine whether the UE 101 is roaming or not. The ESM information for the PDN connection for the UE 101 may be determined further based on whether the UE 101 is roaming or not.

The UE 101 may be further configured to, e.g. by means of an obtaining module 1210, having previously obtained information indicating at least one PLMN, which is equivalent to the PLMN to which the UE 101 attempts to register to. The obtaining module 1210 may be the processor 1205 of the UE 101. The obtaining module 1210 may also be referred to as an obtaining unit, an obtaining means, an obtaining circuit, means for obtaining etc.

The UE 101 may be further configured to, e.g. by means of a deleting module 1213, when the information indicating at least one PLMN which is equivalent to the PLMN to which the UE 101 attempts to register to is absent in the information received from the MME 105, delete the previously obtained information indicating the at least one PLMN which is equivalent to the PLMN which the UE 101 attempts to register to. The deleting module 1213 may be the processor 1205 of the UE 101. The deleting module 1213 may also be referred to as a deleting unit, a deleting means, a deleting circuit, means for deleting etc.

The UE 101 may further comprise a memory 1215 comprising one or more memory units. The memory 1215 configured to be used to store data, received data streams, power level measurements, received information, sent information, information about at least one EPS network feature, determined ESM information, information about at least one PLMN, indications of support for receipt of the information on which the determination of the ESM information should be based, attach request messages, information about roaming, information about home, information about the first PDN connection, previously obtained information about at least one equivalent PLMN, threshold values, time periods, configurations, schedulings, and applications to perform the methods herein when being executed in the UE 101.

Those skilled in the art will also appreciate that the receiving module 1201, the determining module 1203, the sending module 1208, the obtaining module 1210 and the deleting module 1213, described above may refer to a combination of analog and digital circuits, and/or one or more processors configured with software and/or firmware, e.g. stored in a memory, that when executed by the one or more processors such as the processor 1205 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Alternative embodiments of the UE 101 may include additional components responsible for providing additional functionality, including any of the functionality identified above and/or any functionality necessary to support the embodiments described above.

A first computer program may comprise instructions which, when executed on at least one processor, e.g. the processor 1205, cause the at least one processor to carry out the method as described in relation to FIG. 11. A first carrier may comprise the first computer program. The first carrier may be one of an electronic signal, optical signal, radio signal or computer readable storage medium.

Figure 13:
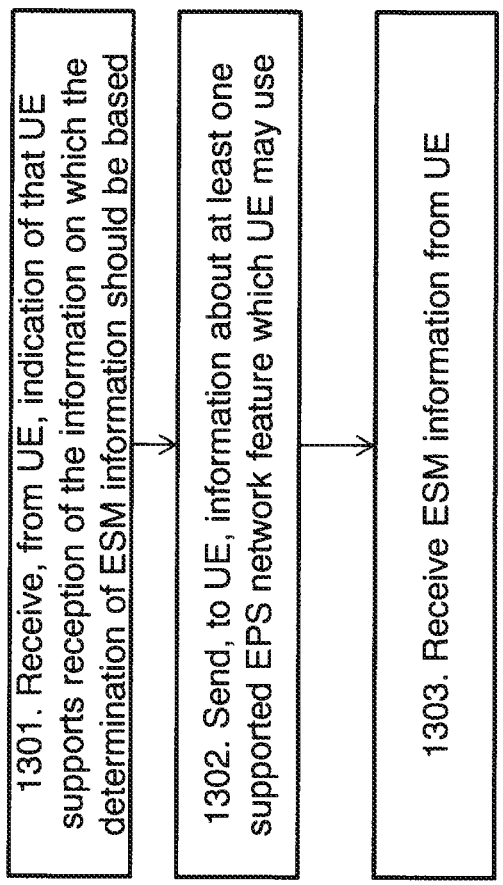
FIG. 13 is a flow chart illustrating embodiments of a method performed by the MME.

The method described above will now be described seen from the perspective of the MME 105. FIG. 13 is a flowchart describing the present method in the MME 105 for handling ESM information. The method comprises the further steps to be performed by MME 105, which steps may be performed in any other suitable order than described below:

Step 1301

This step corresponds to step 401 in FIG. 4, steps 601 and 602 in FIG. 6, steps 701 and 702 in FIG. 7, steps 801 and 802 in FIG. 8, steps 901 and 902 in FIG. 9 and steps 1001 and 1002 in FIG. 10. In some embodiments, the MME 105 receives, from the UE 101, an indication of that the UE 101 supports reception of the information on which the determination of the ESM information should be based.

The indication of that the wireless device 101 supports reception of the information on which the determination of the ESM information should be based may be comprised in an attach request message. The attach request message may be a request for attach to PLMN.

Step 1302

This step corresponds to step 402 in FIG. 4, step 603 in FIG. 6, step 703 in FIG. 7, step 803 in FIG. 8, step 909 in FIG. 9 and step 1003 in FIG. 10. The MME 105 sends, to the UE 101, information about at least one supported EPS network feature which the UE 101 may use. The information is sent before the UE 101 sends ESM information to the MME 105.

In some embodiments, the at least one supported EPS network feature is at least one of: a RAN feature and a CN feature.

In some embodiments, the sent information further comprises information about at least one PLMN which is equivalent to the PLMN which the UE 101 attempts to register to.

In some embodiments, the MME 105 sends the information to the UE 101 when the MME 105 has received the indication in step 1301, i.e the indication is a trigger for sending the information in step 1302.

In some embodiments, the sent information is comprised in an ESM information request message. In some embodiments, the sent information is comprised in an EMM information message. In some embodiments, the sent information is comprised in an EMM request message dedicated for the received information. In some embodiments, the sent information is comprised in an EMM message dedicated for the information. The dedicated EMM message may be comprised in an ESM information request message. In some embodiments, the sent information is comprised in an EMM information message dedicated for the received information. The EMM information message may be comprised in an ESM information request message. In some embodiments, the ESM information is received in an ESM information response message.

Step 1303

This step corresponds to step 406 in FIG. 4, step 604 in FIG. 6, step 706 in FIG. 7, step 806 in FIG. 8, step 904 in FIG. 9 and step 1004 in FIG. 10. The MME 105 receives the ESM information from the UE 101. The ESM information is for a PDN connection for the UE 101. The ESM information has been determined by the UE 101 based on the sent information. The received ESM information may be at least one of an APN and a PCO.

In some embodiments, the ESM information is received in an ESM information response message. In some embodiments, the ESM information is received in an ESM information response message. In some embodiments, the ESM information is received in an ESM information response message. In some embodiments, the ESM information is received in an ESM information response message.

Figure 14:
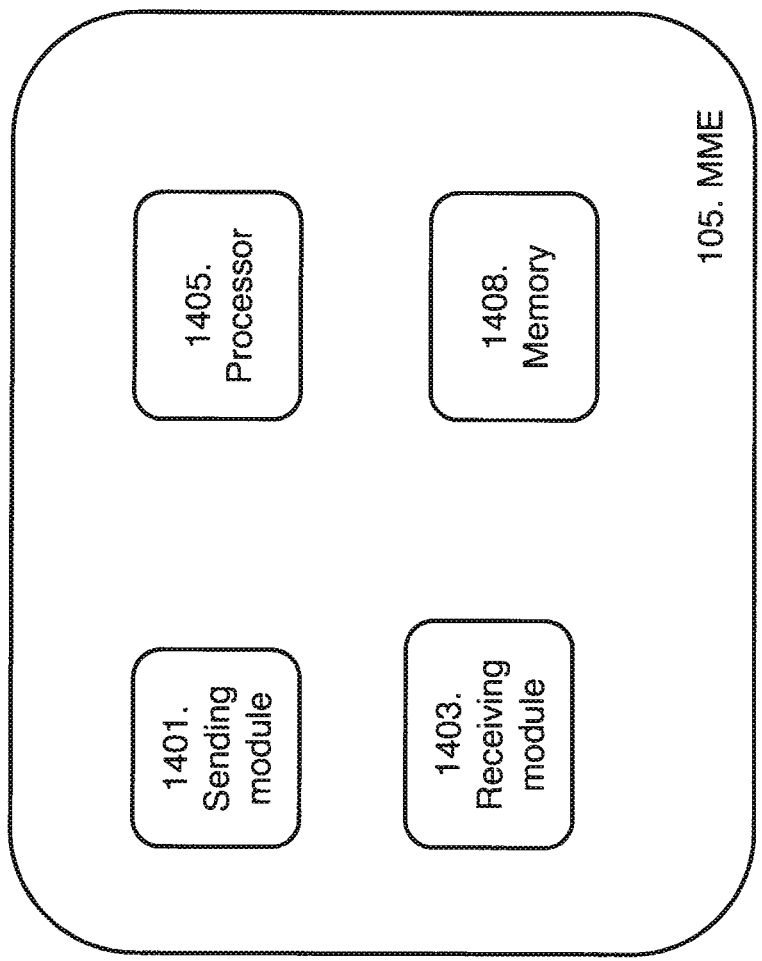
FIG. 14 is a schematic block diagram illustrating embodiments of a MME.

Embodiments of the MME 105 configured to perform the method actions for handling ESM information, as described above in relation to FIG. 13 is depicted in FIG. 14.

The MME 105 is configured to, e.g. by means of a sending module 1401, send, to the UE 101, information about at least one supported EPS network feature which the UE 101 may use. The information is sent before the UE 101 sends ESM information to the MME 105. The at least one supported EPS network feature may be at least one of: a RAN feature and a CN feature. The sent information may further comprise information about at least one PLMN which is equivalent to the PLMN which the UE 101 is configured to attempt to register to. In some embodiments, the sent information is comprised in an ESM information request message. In some embodiments, the sent information is comprised in an EMM information message. In some embodiments, the sent information is comprised in an EMM request message dedicated for the received information. In some embodiments, the sent information is comprised in an EMM message dedicated for the information. The dedicated EMM message may be comprised in an ESM information request message. In some embodiments, the sent information is comprised in an EMM information message dedicated for the received information. The EMM information message may be comprised in an ESM information request message.

The sending module 1401 may also be referred to as a sending unit, a sending means, a sending circuit, means for sending or an output unit. The sending unit 1401 may be a transmitter, a transceiver etc. The sending module 1401 may be a wireless transmitter of the MME 105 of a wireless or fixed communications system.

The MME 105 is configured to, e.g. by means of a receiving module 1403, receive the ESM information from the UE 101. The ESM information is for a PDN connection for the UE 101. The ESM information has been determined by the UE 101 based on the sent information. In some embodiments, the ESM information is received in an ESM information response message. In some embodiments, the ESM information is received in an ESM information response message. In some embodiments, the ESM information is received in an ESM information response message. In some embodiments, the ESM information is received in an ESM information response message. In some embodiments, the ESM information is received in an ESM information response message. The received ESM information may be at least one of an APN and a PCO. The receiving module 1403 may also be referred to as a receiving unit, a receiving means, a receiving circuit, means for receiving or an input unit. The receiving unit 1403 may be a receiver, a transceiver etc. The receiving module 1403 may be a wireless receiver of the MME 105 of a wireless or fixed communications system.

The MME 105 may be further configured to, e.g. by means of the receiving module 1403, receive, from the UE 101, an indication of that the UE 101 supports reception of the information on which the determination of the ESM information should be based. The indication of that the wireless device 101 supports reception of the information on which the determination of the ESM information should be based may be comprised in an attach request message. The attach request message may be a request for attach to PLMN.

In some embodiments, the MME 105 comprises a processor 1405 and a memory 1408. The memory 1408 comprises instructions executable by the processor 1405.

The memory 1408 may comprise one or more memory units. The memory 1408 configured to be used to store data, received data streams, power level measurements, received information, sent information, information about at least one EPS network feature, determined ESM information, information about at least one PLMN, indications of support for receipt of the information on which the determination of the ESM information should be based, attach request messages, information about roaming, information about home, information about the first PDN connection, previously obtained information about at least one equivalent PLMN, threshold values, time periods, configurations, schedulings, and applications to perform the methods herein when being executed in the MME 105.

Alternative embodiments of the MME 105 may include additional components responsible for providing additional functionality, including any of the functionality identified above and/or any functionality necessary to support the solution described above.

Those skilled in the art will also appreciate that the sending module 1401 and the receiving module 1403, described above may refer to a combination of analog and digital circuits, and/or one or more processors configured with software and/or firmware, e.g. stored in a memory, that when executed by the one or more processors such as the processor 1405 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

A second computer program may comprising instructions which, when executed on at least one processor, e.g. the processor 1405, cause the at least one processor to carry out the method as described in relation to FIG. 13. A second carrier may comprise the second computer program. The second carrier may be one of an electronic signal, optical signal, radio signal or computer readable storage medium.

The present mechanism for handling ESM information may be implemented through one or more processors, such as a processor 1205 in the UE 101 arrangement depicted in FIG. 12 and a processor 1405 in the MME 105 arrangement depicted in FIG. 14, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into at least one of the UE 101 and the MME 105. One such carrier may be in the form of a CD ROM disc. It is however feasible with other data carriers such as a memory stick. The computer program code may furthermore be provided as pure program code on a server and downloaded to at least one of the UE 101 and the MME 105.

With the embodiments herein, the UE 101 is able to smartly determine the ESM information (APN, PCOs or both) for the first PDN connection over E-UTRAN depending on supported EPS network features (e.g. whether IMS voice over PS sessions is supported or not), and possibly also depending on whether the HPLMN is equivalent to the registered PLMN.

Furthermore, with the UE's 101 ability to smartly determine the ESM information (APN, PCOs or both) for the first PDN connection over E-UTRAN it may result in creation of only the PDN connection which UE 10 wants.

The UE's 101 inability to smartly determine the ESM information (APN, PCOs or both) for the first PDN connection over E-UTRAN may be resolved with the embodiments herein by that the MME 105 sends the supported EPS network feature information and possibly also the equivalent PLMN information before the UE 101 sends the ESM information.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method in a user equipment (UE) for handling Evolved Packet System (EPS) session management (ESM) information, the method comprising:
    initiating a registration process for registering the UE with a Mobility Management Entity (MME), wherein the step of initiating the registration comprises the UE transmitting to the MME a registration request message for requesting a registration of the UE;

after transmitting the registration request message to the MME and before sending any ESM information to the MME after initiating the registration process and before receiving from the MME a registration request response message indicating whether or not the MME has accepted the registration request, receiving, from the MME, a message comprising EPS network feature information about at least one supported EPS network feature which the UE may use;

in response to receiving the message comprising the EPS network feature information, the UE: i) using the received EPS network feature information to select ESM information for a Packet Data Network (PDN) connection for the UE and ii) sending the selected ESM information to the MME; and after sending to the MME the selected ESM information, receiving from the MME the registration request response message.

2. The method according to claim 1, wherein the EPS network feature information comprises an Internet Protocol Multimedia Subsystem (IMS) voice over packet switched (PS) Session Supported Indication indicating that IMS voice over PS sessions are supported.

3. The method according to claim 1, wherein the registration request message is an Attach Request message comprising information that triggers the MME to transmit the message comprising the EPS network feature information, the message comprising the EPS network feature information is not an Attach Accept message and is not an Attach Reject message, and the registration request response message is one of: an Attach Accept message and an Attach Reject message.

4. The method according to claim 3, wherein the Attach Request message is a request for attach to a first Public Land Mobile Network (PLMN).

5. The method according to claim 4, wherein the UE has a home PLMN (HPLMN), and the received EPS network feature information further comprises information indicating that the UE's home HPLMN is equivalent to the first PLMN.

6. The method according to claim 1, wherein the step of using the received EPS network feature information to select the ESM information for the PDN connection comprises:

the UE determining whether the UE is roaming, wherein the determination is based on the received EPS network feature information, and the UE selecting the ESM information for the PDN connection based on whether the UE is roaming.

7. The method according to claim 1, wherein the UE has previously obtained information indicating at least one Public Land Mobile Network (PLMN) which is equivalent to the PLMN to which the UE attempts to register to; and wherein the method further comprises:

when the information indicating at least one PLMN which is equivalent to the PLMN to which the UE attempts to register to is absent in the information received from the MME, deleting the previously obtained information indicating the at least one PLMN which is equivalent to the PLMN which the UE attempts to register to.

8. The method according to claim 1, wherein the registration request message is an Attach Request message comprising information that triggers the MME to transmit the message comprising the EPS network feature information, the registration request response message is an Attach Accept message, the message comprising the EPS network feature information is an ESM Information Request message transmitted by the MME, wherein the ESM Information Request message is separate and distinct from the Attach Accept message, the step of sending the determined ESM information to the MME comprises sending to the MME an ESM Information Response message comprising the determined ESM information.

9. The method according to claim 1, wherein the registration request message is an Attach Request message comprising information that triggers the MME to transmit the message comprising the EPS network feature information, the registration request response message is an Attach Accept message, and the message comprising the EPS network feature information is one of: (a) a control plane message of type EPS Mobility Management (EMM) Information, wherein the control plane message is separate and distinct from the Attach Accept message and (b) an ESM Information Request message, wherein the ESM Information Request message is separate and distinct from the Attach Accept message.

10. The method according to claim 9, wherein the EPS network feature information comprises an Internet Protocol Multimedia Subsystem (IMS) voice over packet switched (PS) Session Supported Indication indicating if IMS voice over PS sessions are supported.

11. The method according to claim 9, wherein the EPS network feature information comprises roaming information for indicating whether the UE is roaming.

12. The method according to claim 9, wherein the EPS network feature information comprises: (a) roaming information for indicating whether the UE is roaming and (b) Internet Protocol Multimedia Subsystem (IMS) information indicating if IMS voice over PS sessions are supported.

13. The method according to claim 1, wherein the step of selecting the ESM information comprises selecting at least one of: an Access Point Name (APN) and a Protocol Configuration Option.

14. A method in a Mobility Management Entity (MME) for handling Evolved Packet System (EPS) Session Management (ESM) information, the method comprising:

receiving a registration request message transmitted by a user equipment (UE), the request message requesting a registration of the UE;

after receiving the registration request message and before the UE sends any ESM information to the MME after the UE transmits the registration request message and before the MME sends to the UE a registration request response message indicating whether or not the MME has accepted the UE's registration request, sending to the UE a message comprising EPS network feature information about at least one supported EPS network feature which the UE may use;

receiving ESM information from the UE after sending the message comprising the EPS network feature information, wherein the ESM information is for a Packet Data Network (PDN) connection for the UE, and wherein the ESM information has been determined by the UE based on the sent EPS network feature information; and after receiving the ESM information, sending to the UE the registration request response message.

15. The method according to claim 14, wherein the at least one supported EPS network feature is at least one of: a Radio Access Network (RAN) feature and a Core Network feature.

16. The method according to claim 14, further comprising:
receiving, from the UE, an indication that the UE supports reception of the EPS network feature information on which the determination of the ESM information should be based.

17. The method according to claim 16, wherein the step of receiving the indication that the UE supports reception of the EPS network feature information comprises receiving from the UE an Attach Request message comprising the indication,
the Attach Request message is a request for attach to a first Public Land Mobile Network (PLMN),
the message comprising the EPS network feature information is not an Attach Accept message and is not an Attach Reject message, and
the registration request response message is one of: an Attach Accept message and an Attach Reject message.

18. The method according to claim 17, wherein
the UE has a home PLMN (HPLMN), and
the message comprising the EPS network feature information further comprises information indicating that the UE's home HPLMN is equivalent to the first PLMN.

19. The method according to claim 14, wherein
the registration request message is an Attach Request message comprising information that triggers the MME to transmit the message comprising the EPS network feature information,
the registration request response message is an Attach Accept message, and
the message comprising the EPS network feature information is one of: (a) a control plane message of type EPS Mobility Management (EMM) Information, wherein the control plane message is separate and distinct from the Attach Accept message and (b) an ESM Information Request message, wherein the ESM Information Request message is separate and distinct from the Attach Accept message.

20. The method according to claim 19, wherein the EPS network feature information comprises one or more of: (a) roaming information for indicating whether the UE is roaming and (b) an Internet Protocol Multimedia Subsystem (IMS) voice over packet switched (PS) Session Supported Indication indicating if IMS voice over PS sessions are supported.

21. The method according to claim 20, wherein the EPS network feature information comprises the roaming information for indicating whether the UE is roaming and the IMS voice over PS Session Supported Indication.

22. The method according to claim 14, wherein the MME sends to the UE the EPS network feature information in direct response to receiving the registration request message.

23. The method according to claim 22, wherein the registration request message is an Attach Request message, and the registration request response message is one of: an Attach Accept message and an Attach Reject message.

24. The method according to claim 14, wherein the received ESM information is at least one of: an Access Point Name (APN) and a Protocol Configuration Option (PCO).

25. A user equipment (UE) configured for handling Evolved packet system Session Management (ESM) information, the UE comprising:
a receiver;
a transmitter;
a memory; and
a processor coupled to the memory, receiver and transmitter, wherein the UE is operable to:
initiate a registration process for registering the UE with a Mobility Management Entity (MME), wherein the step of initiating the registration comprises the UE transmitting to the MME a registration request message for requesting a registration of the UE;
after transmitting the registration request message to the MME and before sending any ESM information to the MME after initiating the registration process and before receiving a registration request response message from the MME indicating whether or not the MME has accepted the registration request, receiving, from the MME, a message comprising EPS network feature information about at least one supported EPS network feature which the UE may use;
in response to receiving the message comprising the EPS network feature information, i) use the received EPS network feature information to select ESM information for a Packet Data Network (PDN) connection for the UE and ii) send the selected ESM information to the MME; and
after sending to the MME the selected ESM information, receive from the MME the registration request response message.

26. The UE according to claim 25, wherein the at least one supported EPS network feature is at least one of: a Radio Access Network (RAN) feature and a Core Network feature.

27. The UE according to claim 25, being further configured to:
send, to the MME, an indication that the UE supports reception of the EPS network feature information on which the determination of the ESM information should be based.

28. The UE according to claim 27, wherein
the indication of that the UE supports reception of the EPS network feature information on which the determination of the ESM information should be based is comprised in an Attach Request message,
the Attach Request message is a request for attach to a first Public Land Mobile Network (PLMN), and
the registration request response message is one of: an Attach Accept message and an Attach Reject message.

29. The UE according to claim 28, wherein
the UE has a home PLMN (HPLMN), and
the message comprising the EPS network feature information further comprises information indicating that the UE's home HPLMN is equivalent to the first PLMN.

30. The UE according to claim 25, wherein
the UE is configured to use the received EPS network feature information to select the ESM information for the PDN connection by performing a process comprising:
determining whether the UE is roaming, wherein the determination is based on the received EPS network feature information, and
selecting the ESM information for the PDN connection based on whether the UE is roaming.

31. The UE according to claim 25, wherein the UE is configured to:
previously having obtained information indicating at least one Public Land Mobile Network (PLMN) which is equivalent to the PLMN to which the UE attempts to register to; and to
when the EPS network feature information indicating at least one PLMN which is equivalent to the PLMN to which the UE attempts to register to is absent in the EPS network feature information received from the MME, delete the previously obtained information indicating the at least one PLMN which is equivalent to the PLMN which the UE attempts to register to.

32. The UE according to claim 25, wherein
the registration request message is an Attach Request message comprising information that triggers the MME to transmit the message comprising the EPS network feature information,
the registration request response message is an Attach Accept message,
the message comprising the EPS network feature information is an ESM Information Request message transmitted by the MME, wherein the ESM Information Request message is separate and distinct from the Attach Accept message, and
the is configured to send the determined ESM information to the MME by sending to the MME an ESM Information Response message comprising the determined ESM information.

33. The UE according to claim 25, wherein
the registration request message is an Attach Request message comprising information that triggers the MME to transmit the message comprising the EPS network feature information,
the registration request response message is an Attach Accept message, and
the message comprising the EPS network feature information is one of: (a) a control plane message of type EPS Mobility Management (EMM) Information, wherein the control plane message is separate and distinct from the Attach Accept message and (b) an ESM Information Request message, wherein the ESM Information Request message is separate and distinct from the Attach Accept message.

34. The UE according to claim 25, wherein the message comprising the EPS network feature information is an Evolved packet system Mobility Management (EMM) request message dedicated for the received information; and
wherein the determined ESM information is sent in an ESM information response message.

35. The UE according to claim 25, wherein the message comprising the EPS network feature information is an Evolved packet system Mobility Management (EMM) message dedicated for the EPS network feature information, wherein the dedicated EMM message is comprised in an ESM information request message; and
wherein the determined ESM information is sent in an ESM information response message.

36. The UE according claim 25, wherein the message comprising the EPS network feature information is an EMM information message dedicated for the received information, wherein the EMM information message is comprised in an ESM information request message; and
wherein the determined ESM information is sent in an ESM information response message.

37. The UE according to claim 25, wherein the determined ESM information is at least one of: an Access Point Name (APN) and a Protocol Configuration Option.

38. A Mobility Management Entity (MME) configured for handling Evolved packet system Session Management (ESM) information, the MME comprising:
a receiver;
a transmitter;
a memory; and
a processor coupled to the memory, receiver and transmitter, wherein the MME is operable to:
receive a registration request message transmitted by a user equipment (UE), the request message requesting a registration of the UE;
after receiving the registration request message and before the UE sends any ESM information to the MME after the UE transmits the registration request message and before the MME sends to the UE a registration request response message indicating whether or not the MME has accepted the UE's registration request, send to the UE a message comprising EPS network feature information about at least one supported EPS network feature which the UE may use;
receive ESM information from the UE after sending the message comprising the EPS network feature information, wherein the ESM information is for a Packet Data Network (PDN) connection for the UE, and wherein the ESM information has been determined by the UE based on the sent EPS network feature information; and
after receiving the ESM information, send to the UE the registration request response message.

39. The MME according to claim 38, wherein the at least one supported EPS network feature is at least one of: a Radio Access Network (RAN) feature and a Core Network feature.

40. The MME according to claim 38, being further configured to:
receive, from the UE, an indication that the UE supports reception of the EPS network feature information on which the determination of the ESM information should be based.

41. The MME according to claim 40, wherein
the indication that the wireless device supports reception of the EPS network feature information on which the determination of the ESM information should be based is comprised in an Attach Request message,
the Attach Request message is a request for attach to first Public Land Mobile Network (PLMN),
the message comprising the EPS network feature information is not an Attach Accept message and is not an Attach Reject message, and
the registration request response message is one of: an Attach Accept message and an Attach Reject message.

42. The MME according to claim 41, wherein
the UE has a home PLMN (HPLMN), and
the message comprising the EPS network feature information further comprises information indicating that the UE's home HPLMN is equivalent to the first PLMN.

43. The MME according to claim 38, wherein the message comprising the EPS network feature information is an ESM information request message; and
wherein the ESM information is received in an ESM information response message.

44. The MME according to claim 38, wherein the message comprising the EPS network feature information is an Evolved packet system Mobility Management, EMM, information message; and
wherein the ESM information is received in an ESM information response message.

45. The MME according to claim 38, wherein
the registration request message is an Attach Request message comprising information that triggers the MME to transmit the message comprising the EPS network feature information,
the registration request response message is an Attach Accept message, and the message comprising the EPS network feature information is one of: (a) a control plane message of type EPS Mobility Management (EMM) Information, wherein the control plane message is separate and distinct from the Attach Accept message and (b) an ESM Information Request message, wherein the ESM Information Request message is separate and distinct from the Attach Accept message.

46. The MME according to claim 38, wherein the message comprising the EPS network feature information is an Evolved packet system Mobility Management, EMM, message dedicated for the EPS network feature information, wherein the dedicated EMM message is comprised in an ESM information request message; and
wherein the ESM information is received in an ESM information response message.

47. The MME according to claim 38, wherein the message comprising the EPS network feature information is an EMM information message dedicated for the received information, wherein the EMM information message is comprised in an ESM information request message; and
wherein the ESM information is received in an ESM information response message.

48. The MME according to claim 38, wherein the received ESM information is at least one of: an Access Point Name (APN) and a Protocol Configuration Option.

49. A computer program product comprising a non-transitory computer readable medium storing a computer program comprising instructions which, when executed on at least one processor, cause the at least one processor to carry out the method according to claim 1.

50. A computer program product comprising a non-transitory computer readable medium storing a computer program comprising instructions which, when executed on at least one processor, cause the at least one processor to carry out the method according to claim 14.

51. The method of claim 1, wherein
the UE has a home Public Land Mobile Network (PLMN),
the registration request message is an Attach Request message for attaching to a first PLMN, wherein the first PLMN is not the UE's home PLMN (HPLMN),
the message comprising the EPS network feature information is neither an Attach Accept message nor an Attach Reject message, and
the step of using the received EPS network feature information to select the ESM information for the PDN connection comprises:
i) the UE determining whether the received EPS network feature information includes information indicating that the UE's HPLMN is equivalent to the first PLMN, and
ii) the UE selecting the ESM information for the PDN connection based on whether the received EPS network feature information includes information indicating that the UE's HPLMN is equivalent to the first PLMN.

52. The UE of claim 25, wherein
the UE has a home PLMN (HPLMN),
the registration request message is an Attach Request message for attaching to a first PLMN, wherein the first PLMN is not the UE's home PLMN (HPLMN),
the message comprising the EPS network feature information is neither an Attach Accept message nor an Attach Reject message, and
the UE is configured to use the received EPS network feature information to select the ESM information for the PDN connection by performing a process comprising:
i) determining whether the received EPS network feature information includes information indicating that the UE's HPLMN is equivalent to the first PLMN, and
ii) selecting the ESM information for the PDN connection based on whether the received EPS network feature information includes information indicating that the UE's HPLMN is equivalent to the first PLMN.

* * * * *